(12) United States Patent
Harel et al.

(10) Patent No.: US 12,493,450 B2
(45) Date of Patent: Dec. 9, 2025

(54) SYSTEM AND METHOD FOR BIG NUMBER HARDWARE MULTIPLICATION FOR CRYPTOGRAPHY

(71) Applicant: Sandisk Technologies, Inc., Milpitas, CA (US)

(72) Inventors: Itzchak Harel, Jerusalem (IL); Roy Naor, Tel Aviv (IL); Ishai Ilani, Dolev (IL)

(73) Assignee: Sandisk Technologies, Inc., Milpitas, CA (US)

( * ) Notice: Subject to any disclaimer, the term of this patent is extended or adjusted under 35 U.S.C. 154(b) by 961 days.

(21) Appl. No.: 17/562,490

(22) Filed: Dec. 27, 2021

(65) Prior Publication Data

US 2023/0205491 A1  Jun. 29, 2023

(51) Int. Cl.
*G06F 7/72* (2006.01)
*G06F 17/17* (2006.01)

(52) U.S. Cl.
CPC .............. *G06F 7/722* (2013.01); *G06F 17/17* (2013.01); *G06F 7/724* (2013.01); *G06F 7/728* (2013.01)

(58) Field of Classification Search
CPC .......... G06F 7/722; G06F 7/724; G06F 7/727; G06F 7/728; G06F 17/10; G06F 17/144; G06F 17/16; G06F 17/17; H04L 9/30; H04L 9/3006; H04L 9/3013; H04L 9/302; H04L 9/3026; H04L 9/3033; H04L 9/3066; H04L 9/3093
See application file for complete search history.

(56) References Cited

U.S. PATENT DOCUMENTS

2011/0106872 A1  5/2011  Hasenplaugh et al.
2019/0310828 A1  10/2019  Langhammer et al.

OTHER PUBLICATIONS

N. E. Mrabet et al., Efficient Multiplication in Finite Field Extensions of Degree 5, Progress in Cryptology—ACRICACRYPT 2011, LNCS6737, 2011 (Year: 2011).*
J. Ding et al., High-Speed ECC Processor Over NIST Prime Fields Applied with Toom-Cook Multiplication, IEEE Transactions on Circuits and Systems—I: Regular Papers, vol. 66, No. 3, 2019 (Year: 2019).*
C.H. Liu et al., Efficient Digit-Serial KA-Based Multiplier Over Binary Extension Fields Using Block Recombination Approach, IEEE Transactions on Circuits and Systems—I: Regular Papers, vol. 62, No. 8, 2015 (Year: 2015).*

* cited by examiner

*Primary Examiner* — Emily E Larocque
(74) *Attorney, Agent, or Firm* — Crowell & Moring LLP

(57) ABSTRACT

A system performs big number multiplication during a cryptographic process. This can occur, for example, when a controller in a storage system encrypts data for storage in its memory or decrypts data read from its memory. To perform the multiplication of these big input numbers quickly, the system uses a modified Toom-Cook algorithm comprising a plurality of levels of coefficient vectors for each of the input numbers. This involves performing a sample extraction process, a point multiplication process, and an interpolation (synthesis) process.

18 Claims, 17 Drawing Sheets

FIG. 16

SYSTEM AND METHOD FOR BIG NUMBER HARDWARE MULTIPLICATION FOR CRYPTOGRAPHY

BACKGROUND

In cryptography, big numbers, typically modulu big prime numbers or modulu a product of two prime numbers, are used to encrypt and decrypt data, protecting it from third parties. The protecting key may be as large as 512 or 1,024 (or more) bits. The multiplication of these big numbers with input data often needs to be performed quickly and efficiently. For example, in the field of communications, these calculations are done in real time and should not create latency in encrypting and decrypting data. Expressed mathematically, the multiplication $z=x \cdot y$, needs to be computed efficiently, where x and y are both big numbers represented by 512 or 1,024 (or more) bits. Further, in many cryptographic applications, exponentiation is required, where both the base and exponent may be large.

BRIEF DESCRIPTION OF THE DRAWINGS

FIG. 16 is a chart of sample points of an embodiment.

DETAILED DESCRIPTION

Brief Overview

The following embodiments generally relate to performing big number multiplication. Such multiplication may be used in cryptography. For example, a controller in a storage system may use these embodiments in a cryptographic process to encrypt data to be stored in the storage system's memory and to decrypt data read from the storage system's memory. These embodiments can also be used in a host in communication with the storage system or, more generally, in a processor in an electronic device.

In general, the multiplication process in these embodiments comprises receiving input numbers x and y for multiplication, generating a plurality of levels of coefficient vectors for x and for y, and performing a sample extraction process that involves multiplying the plurality of levels of coefficient vectors for x by a first decomposition matrix to yield a first result vector and multiplying the plurality of levels of coefficient vectors for y by a second decomposition matrix to yield a second result vector. Next, a point multiplication process is performed by multiplying the first and second result vectors to yield a third result vector. A point multiplication process of first vector and a second vector is a multiplication process where each coordinate of the first vector is multiplied by the corresponding coordinate of the second vector, thus the third result vector is a vector of the same dimension as the first and second vectors, and each coordinate of the third vector is a product of the corresponding coordinates of the first and second vectors. Then, an interpolation process is performed by multiplying the third result vector by a synthesis matrix to yield a result and dividing the result by a constant to yield a final result. Other embodiments are provided and can be used alone or in combination.

Exemplary Systems

Figure 1A:
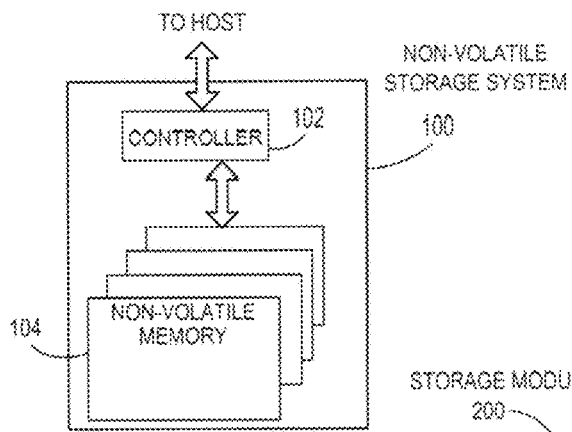
FIG. 1A is a block diagram of a non-volatile storage system of an embodiment.
Figure 1B:
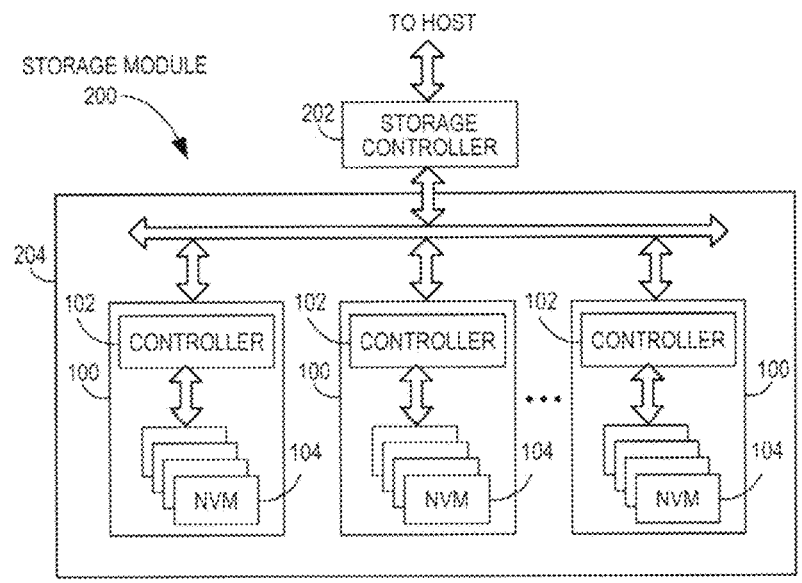
FIG. 1B is a block diagram illustrating a storage module of an embodiment.
Figure 1C:
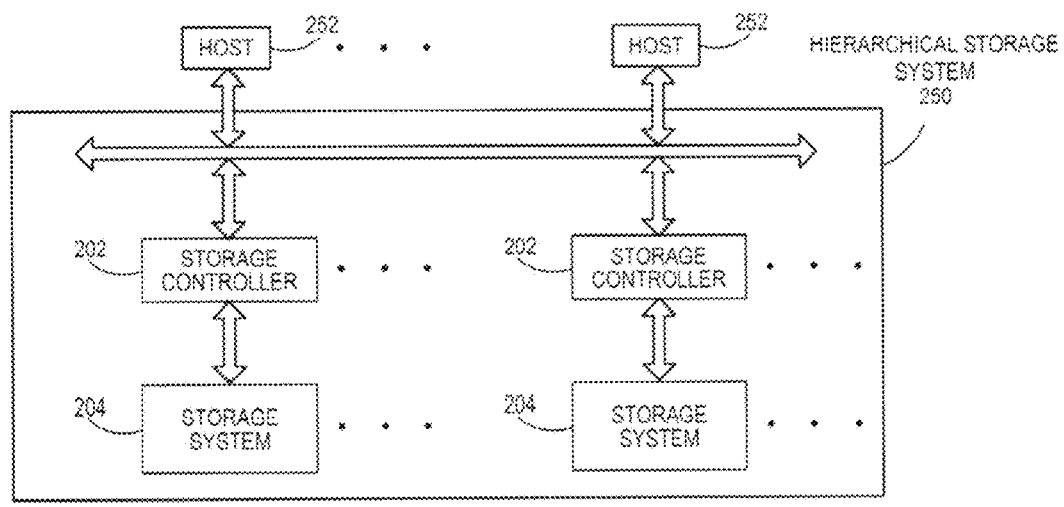
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magneto-resistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be formed external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory cells that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including ReRAM, MRAM, PCM, NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), quad-level cell (QLC), or combinations thereof, or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card-based system, such as a secure digital (SD) or a micro secure digital (micro-SD) card (or USB, SSD, etc.). In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
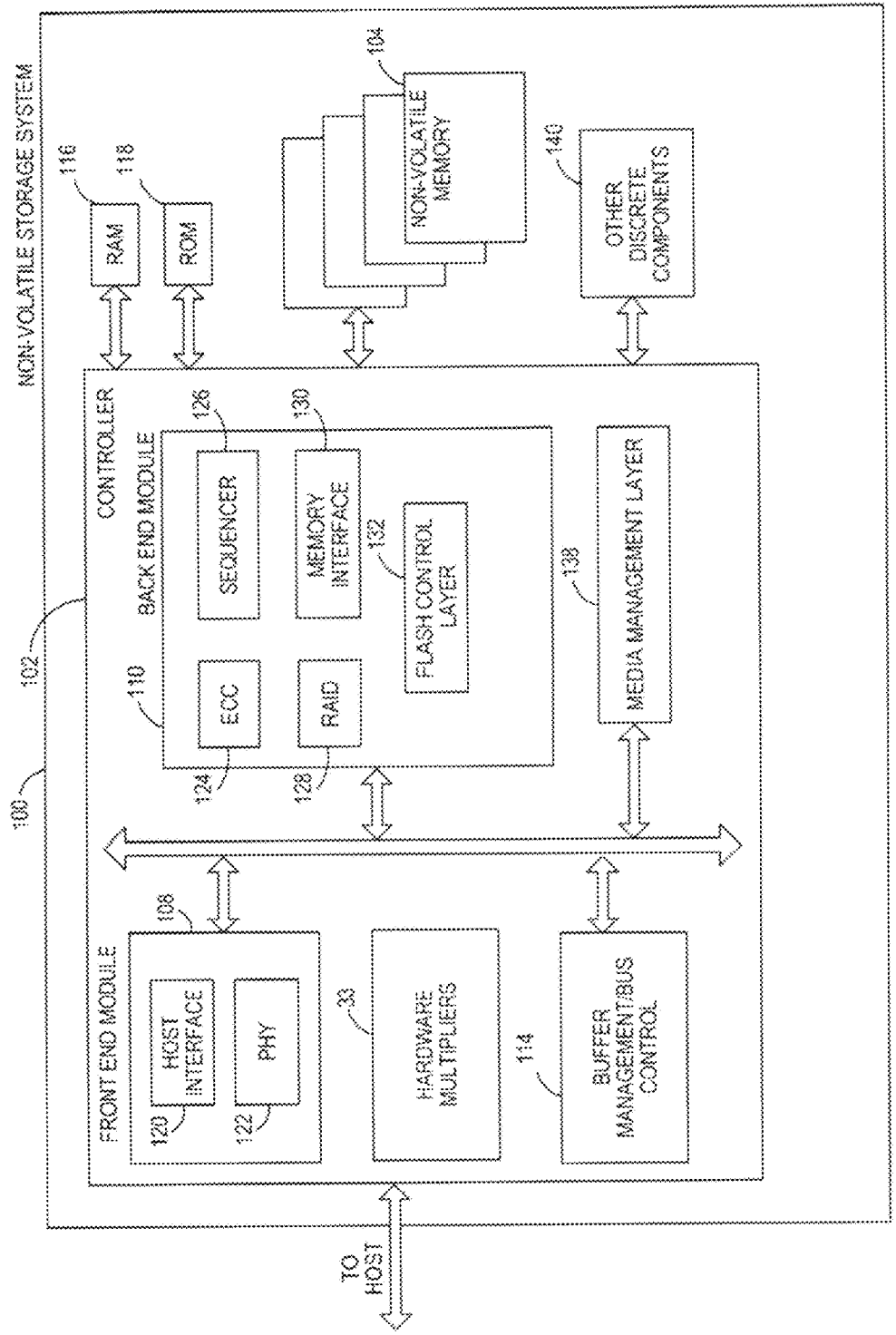
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below. The controller 102 in this embodiment comprises one or more hardware multipliers 33, which can be used to implement the below functions.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
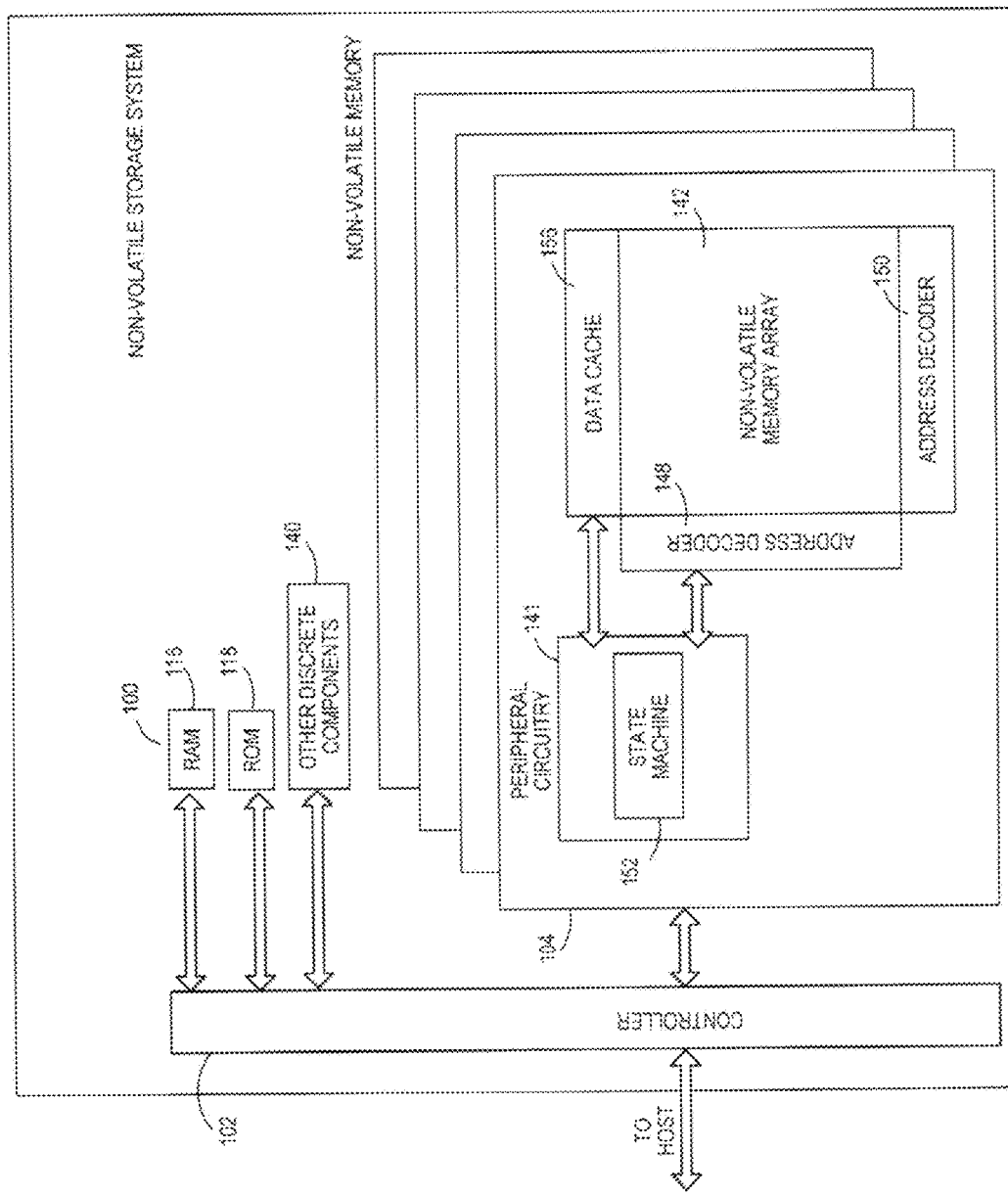
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block of memory cells. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
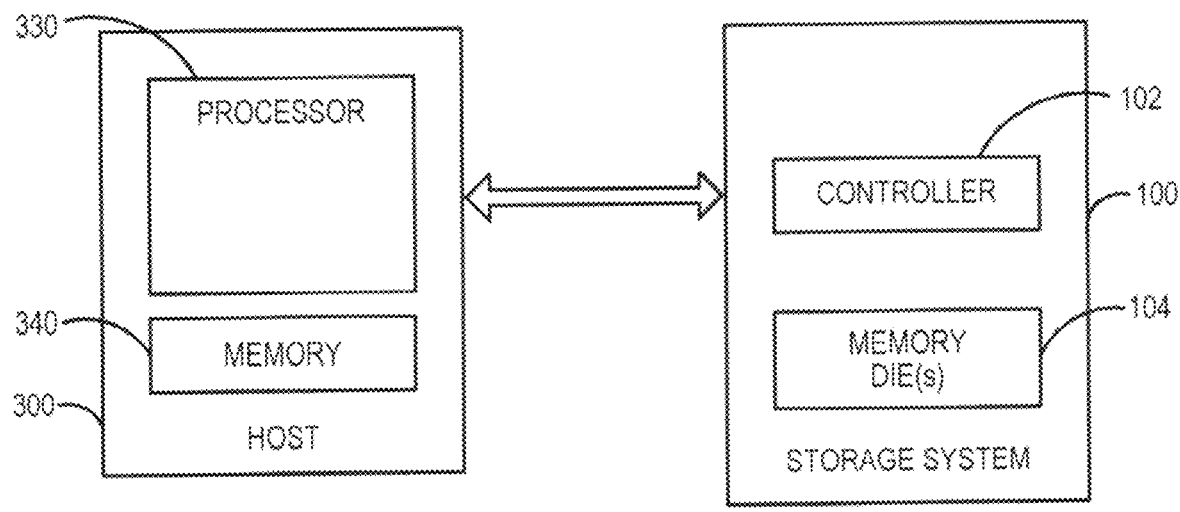
FIG. 3 is a block diagram of a host and a storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340 (e.g., DRAM)) to the storage system 100 for storage in the storage system's memory 104 (e.g., non-volatile memory dies). While the host 300 and the storage system 100 are shown as separate boxes in FIG. 3, it should be noted that the storage system 100 can be integrated in the host 300, the storage system 100 can be removably connected to the host 300, and the storage system 100 and host 300 can communicate over a network. It should also be noted that the memory 104 can be integrated in the storage system 100 or removably connected to the storage system 100.

Big Number Hardware Multiplication for Cryptography

As noted above, in cryptography, big numbers, typically modulu big prime numbers, or modulu a product of two prime numbers are used to encrypt and decrypt data, protecting it from third parties. The protecting key numbers may be as large as 512 or 1,024 (or more) bits. The multiplication of these big numbers with input data often needs to be performed quickly and efficiently. For example, in the field of communications, these calculations are done in real time and should not create latency in encrypting and decrypting data. Expressed mathematically, the multiplication $z=x \cdot y$, needs to be computed efficiently, where x and y are both big numbers represented by 512 or 1,024 (or more) bits. Further, in many cryptographic applications, exponentiation is required, where both the base and exponent may be large.

It is desired to improve the process of performing many large multiplications to achieve an overall larger improvement to the whole system. The challenge, hence, is to provide an efficient big numbers multiplier for cryptographic applications that can be implemented efficiently in hardware and that is bit exact.

The current cryptographic big number multipliers use standard ("schoolbook") and Karatsuba methods. In both standard multiplication and Karatsuba method we may convert the big multiplication into several smaller multiplications, the results of which can be calculated using smaller standard multipliers.

Assume inputs x, y with n bits. We can split the numbers into upper and lower halves (by bits):

$$x=x_1*2^{n/2}+x_2, y=y_1*2^{n/2}+y_2$$

Performing direct school multiplication requires computing $x_1 \cdot y_1$, $x_1 \cdot y_2$, $x_2 \cdot y_1$, and $x_2 \cdot y_2$. So, four multiplications ($2^2$) are required.

Using a simple Karatsuba multiplication, the product may be expressed as:

$$xy=x_1 y_1*2^n+(x_1 y_2+x_2 y_1)*2^{n/2} x_2 y_2$$

which is equivalent to:

$$xy=x_1 y_1*2^n+((x_1+x_2)(y_1+y_2)-x_1 y_1-x_2 y_2)*2^{n/2}+x_2 y_2$$

Thus using the Karatsuba method we need to compute only three multiplications for numbers with ~n/2 bits, ($x_1 y_1$, $x_2y_2$, $(x_1+x_2)(y_1+y_2)$) which can be used to calculate the larger result using addition (of positive or negative) and shifting ($2^t$ is equivalent to shifting t bits), which are efficient in hardware. The equivalence shown allows the calculation of only three smaller multiplications instead of four, where four are used in a more-basic multiplication schemes.

We can continue to use this method recursively, splitting each multiplication into three smaller multiplications, and, for L recursion levels, obtain $3^L$ multiplication of $n/2^L$ bits, which can be pieced together by shifting and adding each base multiplication result to the relevant bit range of the final result, taking into account all recursion levels. Standard multiplication L recursion levels will require $4^L$ multiplications of $n/2^L$ bits.

In the Toom-Cook method, we generalize the approach shown in Karatsuba, where in each recursion level, we split each number into m parts instead of exactly two. This makes the mathematical analysis of each level more complex and introduces the need for multiplication by small constants. But, in hardware implementation, Toom-Cook does not add costly operation and allows splitting the numbers into sufficiently small parts for base multiplication with fewer recursion levels.

For example, in Toom-Cook with four parts, we can split x, y into 16 smaller parts using only two levels of recursion ($4^2$), in comparison to four levels of recurion required in Karatsuba ($2^4$). As each recursion level adds more complexity to the implementation, Toom-Cook can achieve better performance using a less-complex implementation, which can be implemented in practice in practical hardware.

Our approach to Toom-Cook allows generalizing the full computation for any number of parts per recursion level, and for any number of recursion levels, in a modular way, which combines all required steps into only three, with one operator at each step combining many actions into one. This allows fast design of different solutions that can be compared to maximize performance. The controller 102 can include specific circuitry (e.g., the hardware multipliers 33) for implementing the big number multiplication processes described below.

The following embodiments can be used to outperform the current cryptographic big number multipliers by reducing the big number multiplier to smaller multiplications and using hardware shifters and adders that perform the massive multiplier computation in a more efficient and simple manner. This allows the multiplication to be implemented in hardware that will be faster and to consume less energy.

In general, these embodiments use the Toom-Cook method and calculate the big number multiplication, $z=x \cdot y$, as a polynomial product given below:

$$z(t) \stackrel{def}{=} x(t) \cdot y(t) \quad (1)$$

These embodiments convert x, y to the polynomials x(t) and y(t), to find their values at specific points, to find the values of the polynomial z(t) at the same specific points by point multiplication, to interpolate the coefficients of z(t) from the points, and then to finally convert back from polynomial z(t) to the desired number z using substitution of the base, where the result is bit exact (no approximations are made).

In one embodiment we provide a one recursion level scheme for Toom-Cook with four parts, which use standard Toom-Cook algorithms. These embodiments also provide an improved two recursion level scheme and a general n recursion level scheme using modular matrix representation. In addition, these embodiments provide for division by 3, 5 or other small prime numbers that is needed in the last stage of the computation. Additionally, these embodiments provide how the multiplication can be done modulus n, by combining Toom-Cook with a Montgomery modular multiplier.

The One Recursion Level Toom Cook—Four Scheme:

(1) In this embodiment, the processor extracts the coefficients of x(t) and y(t) polynomials. x and y input numbers are divided into 4 parts in a way that the highest part (msb) is at index 3.

$x(base=t)=x_3*base^3+x_2*base^2+x_1*base+x_0$ $x_{coeff}=[x_3,x_2,x_1,x_0]$, base=$t=2^{128}$ For example, to compute the n'th coefficient of x, we compute:

for i=0 to (n−1)

$x_i=x$ % base $x=(x-x_i)$/base end $x_n=x$ % base

The modulu division extract the needed rightmost part.

Note that with binary numbers, each group of 128 bits is taken simply as is as the coefficient and no computation is needed, only shifting.

(2) The processor then computes 2 specific sample products $x_0 \cdot y_0$ and $x_3 \cdot y_3$. Note that $$z(0) = x(0) \cdot y(0) = x_0 \cdot y_0 \text{ and } x_3 \cdot y_3 = \lim_{t \to \infty}\left(\frac{x(t)}{t^3}\right) \cdot \lim_{t \to \infty}\left(\frac{y(t)}{t^3}\right) = \lim_{t \to \infty}\left(\frac{z(t)}{t^6}\right)$$

thus we shall refer to $x_0 \cdot y_0$ as $z(t=0)$ and we shall refer to $x_3 \cdot y_3$ as $z(t=\infty)$ even tough the second term is more accurately described above as $$\lim_{t \to \infty}\left(\frac{x(t) \cdot y(t)}{t^6}\right);$$

(3) The processor then computes the matrixes $T_z$, $T_x$, $T_y$, which are used to evaluate the polynomials x(t), y(t), z(t) at specific points. Note that x and y are split into four parts (four coefficients with base $2^{128}$), the degree of x(t) is 3, and similarly the degree of y(t) is 3 and hence the polynomial degree of z, (dz), is 6. $T_z$ is a matrix of size 5×7 and the element of $T_z$ at row i column j is $t_i^{dz-j+1}$ for 5 sampling points $t_i$. The sampling points may be chosen arbitrarily, small sampling points are preferred in order to keep the numbers in the algorithm as small as possible.

The specific values defined in this embodiment are $\{t_1=1, t_2=-1, t_3=2, t_4=-2, t_5=3\}$ for Tz (Tz does not include the sample points at t=0 and t=inf), but any other small values may be chosen, such that the values of the matrix Tz are still sufficiently small.

$$Tz = \begin{pmatrix} t_1^{dz} & \cdots & t_1^0 \\ \vdots & \ddots & \vdots \\ t_{dz-1}^{dz} & \cdots & t_{dz-1}^0 \end{pmatrix} = \begin{pmatrix} 1^6 & \cdots & 1^0 \\ \vdots & \ddots & \vdots \\ 3^6 & \cdots & 3^0 \end{pmatrix}$$

$Tz * z_{coeff} == (z(t_1), z(t_2), z(t_3), z(t_4), z(t_5))^T$

Tx and Ty are extracted from Tz as the last four columns of Tz:

$$Tx = Ty = Tz[:, (dz+1-dx):(dz+1)] = \begin{pmatrix} t_1^{dx} & \cdots & t_1^0 \\ \vdots & \ddots & \vdots \\ t_{dz-1}^{dx} & \cdots & t_{dz-1}^0 \end{pmatrix} =$$

$$\begin{pmatrix} 1^3 & \cdots & 1^0 \\ \vdots & \ddots & \vdots \\ 3^3 & \cdots & 3^0 \end{pmatrix}$$

Note that these matrices are calculated once offline and are later used conveniently in the on-line scheme.

(4) The processor then computes five samples of x and y using the Tx and Ty matrices:
The samples of x=Tx multiplied by the coefficients of x
The samples of y=Ty multiplied by the coefficients of y $$Tx * x_{samp} = Tx * \begin{pmatrix} x_3 \\ x_2 \\ x_1 \\ x_0 \end{pmatrix} = \begin{pmatrix} x(1) \\ x(-1) \\ x(2) \\ x(-2) \\ x(3) \end{pmatrix} = (x(t_1), x(t_2), x(t_3), x(t_4), x(t_5))^T$$

(5) The processor then computes five samples of z by point multiplication of the samples of x and y that were computed earlier:

$$z(t) = x(t) * y(t) \rightarrow \begin{pmatrix} z(1) \\ z(-1) \\ z(2) \\ z(-2) \\ z(3) \end{pmatrix} = \begin{pmatrix} x(1)*y(1) \\ x(-1)*y(-1) \\ x(2)*y(2) \\ x(-2)*y(-2) \\ x(3)*y(3) \end{pmatrix}$$

add $z(0)$ and $z(\infty)$ to the computed 5 z samples:

Let $\widetilde{T}_z$ denote the matrix which contains all the columns of $T_z$ except for the first and last columns, (in Matlab style $\widetilde{T}_z = T_z(:, 2:(end-1))$. Then $$z_{samples} = \begin{pmatrix} z(\infty) \\ z(1) \\ z(-1) \\ z(2) \\ z(-2) \\ z(3) \\ z(0) \end{pmatrix} = \begin{pmatrix} 1 & 0 & \cdots & 0 \\ & T_z & \\ 0 & \cdots & 0 & 1 \end{pmatrix} \begin{pmatrix} z(\infty) = z_6 \\ z_5 \\ z_4 \\ z_3 \\ z_2 \\ z_1 \\ z(0) = z_0 \end{pmatrix} = \begin{pmatrix} 1 & 0 & \cdots & 0 \\ 1^6 & & 1 \\ (-1)^6 & & 1 \\ 2^6 & \widetilde{T}_z & 1 \\ (-2)^6 & & 1 \\ 3^6 & & 1 \\ 0 & \cdots & 0 & 1 \end{pmatrix} \begin{pmatrix} z_6 \\ z_5 \\ z_4 \\ z_3 \\ z_2 \\ z_1 \\ z_0 \end{pmatrix}.$$

Subtracting $z_6(1, 1^6, (-1)^6, 2^6, (-2)^6, 3^6, 0)^T + z_0 (0, 1, 1, 1, 1, 1, 1)^T$ from z_samples we have $$z_{samples} - z_6 \begin{pmatrix} 1 \\ 1 \\ 1 \\ 64 \\ 64 \\ 729 \\ 0 \end{pmatrix} - z_0 \begin{pmatrix} 0 \\ 1 \\ 1 \\ 1 \\ 1 \\ 1 \\ 1 \end{pmatrix} = \begin{pmatrix} 0 \\ z(1) - z_6 - z_0 \\ z(-1) - z_6 - z_0 \\ z(2) - 64 \cdot z_6 - z_0 \\ z(-2) - 64 \cdot z_6 - z_0 \\ z(3) - 729 \cdot z_6 - z_0 \\ 0 \end{pmatrix} = \widetilde{T}_z \begin{pmatrix} z_5 \\ z_4 \\ z_3 \\ z_2 \\ z_1 \end{pmatrix}$$

(6) The processor then computes the coefficients $z_5, z_4, z_3, z_2, z_1$ of z(t) from the samples. Explicitly $$\begin{pmatrix} z_5 \\ z_4 \\ z_3 \\ z_2 \\ z_1 \end{pmatrix} = \widetilde{T}_z^{-1} \begin{pmatrix} z(1) - z_6 - z_0 \\ z(-1) - z_6 - z_0 \\ z(2) - 64 \cdot z_6 - z_0 \\ z(-2) - 64 \cdot z_6 - z_0 \\ z(3) - 729 \cdot z_6 - z_0 \end{pmatrix}$$

In this embodiment, the computation can be done with the inverse of the $\widetilde{T}_z$ matrix based on the fact that the matrix is a Vandermonde matrix that has an inverse.

Another way to express this. Denote $(z_5, z_4, z_3, z_2, z_1)^T$ as z_coeff_mid and denote the samples $(z(1), z(-1), z(2), z(-2), z(3))^T$ as z_samples_mid.

z_coeff_mid= $\widetilde{T}_z^{-1}$·(z_samples_mid−Tz(:,1)·$z_{dz}$−Tz(:, dz+1)·$z_0$) and z_coeff=[$z_{dz}$; z_coeff_mid; $z_0$];

Where $\widetilde{T}_z$ is Tz without the first and last column, and we account for the removal of these columns by subtracting $z_6 * t^6 + z_0$ from each sample (treating the sample for polynomial without $z_6$, $z_0$).

In one embodiment, the entire calculation can be done by two/one matrix multiplications:
1-Subtraction:

$$\begin{pmatrix} 1 & 0 & \cdots & 0 \\ -Tz(:, 1) & ID_{dz-1 \times dz-1} & -Tz(:, dz+1) \\ 0 & 0 & \cdots & 1 \end{pmatrix}$$

where multiplying the samples of z by this matrix subtracts the required value $z_6 * t^6 + z_0$ from each sample.
2-Multiplication by Inverse:

$$\begin{pmatrix} 1 & 0 & \cdots & 0 \\ 0_{dz-1 \times 1} & \widetilde{T}_z^{-1} & 0_{dz-1 \times 1} \\ 0 & 0 & \cdots & 1 \end{pmatrix}$$

where multiplying the samples of z by this matrix does the reverse of Tz—it obtains coefficients from samples (where Tz gets samples from coefficients).

The inverse matrix contains values that are fractions (not whole numbers) and would normally be stored in floating point values. However, since bit-exact calculation is desired and floating point does not hold exact values, this embodiment provides that by multiplying all values by 120, all coefficients become integer numbers that will preserve the bit-exact computation.

$$\begin{pmatrix} 1 & 0 & \cdots & 0 \\ 0_{dz-1 \times 1} & \widetilde{T}_z^{-1} & 0_{dz-1 \times 1} \\ 0 & 0 & \cdots & 1 \end{pmatrix} * 120 = \text{matrix with whole coefficents}$$

It should be noted that the final result will be multiplied by 120, and a division may be needed at the final computation stage.

The full coefficient vector of z can be computed by applying both matrixes on the 7 Z(t) samples:

$$120 \cdot z_{coeff} = 120 \begin{pmatrix} 1 & 0 & \cdots & 0 \\ 0_{dz-1 \times 1} & \widetilde{T}_z^{-1} & 0_{dz-1 \times 1} \\ 0 & 0 & \cdots & 1 \end{pmatrix}$$

-continued $$\begin{pmatrix} 1 & 0 & \ldots & 0 \\ -Tz(:,1) & ID_{dz-1 \times dz-1} & -Tz(:,dz+1) \\ 0 & 0 & \ldots & 1 \end{pmatrix} \cdot z_{samples}$$

We can do the multiplication right-to-left, multiplying by the subtraction matrix and then multiplying the result by the inversion matrix, or we can calculate the equivalent matrix of the two in advance and then multiply by one matrix:

$$120 \cdot z_{coeff} = \widehat{Tz} * z_{samples}$$

$$\widehat{Tz} = 120 \begin{pmatrix} 1 & 0 & \ldots & 0 \\ 0_{dz-1 \times 1} & \widehat{Tz}^{-1} & 0_{dz-1 \times 1} \\ 0 & 0 & \ldots & 1 \end{pmatrix} \begin{pmatrix} 1 & 0 & \ldots & 0 \\ -Tz(:,1) & ID_{dz-1 \times dz-1} & -Tz(:,dz+1) \\ 0 & 0 & \ldots & 1 \end{pmatrix}$$

where the largest matrix coefficient $1800=2^3 \cdot 3^2 \cdot 5^2 < 2^{11}$, is still relatively small and comprised of small prime numbers.

(7) The processor then computes the number expressed by the polynomial of z result=z(base=$2^{128}$)=$z_{dz}$*base$^{dz}$+ . . . +$z_1$*base+
$z_0$=$z_6$*$(2^{128})^6$+ . . . +$z_1$*$2^{128}$+$z_0$ which can be mathematically expressed as:

$$(2^{768} \quad 2^{640} \quad 2^{512} \quad 2^{384} \quad 2^{256} \quad 2^{128} \quad 2^0) \begin{pmatrix} z_6 \\ z_5 \\ z_4 \\ z_3 \\ z_2 \\ z_1 \\ z_0 \end{pmatrix}$$

Note that this operation can performed in hardware by simple shifts and additions without additional multiplications. Also note that the result obtained by the scheme is x*y*120, and that a division by 120 is needed. Since $120=2^3*3*5$, the division can be expressed as dividing by $2^3$, which is just shifting three bits to the right, followed by division of 3*5, which can be done efficiently in hardware, as will be shown below.

Figure 4:
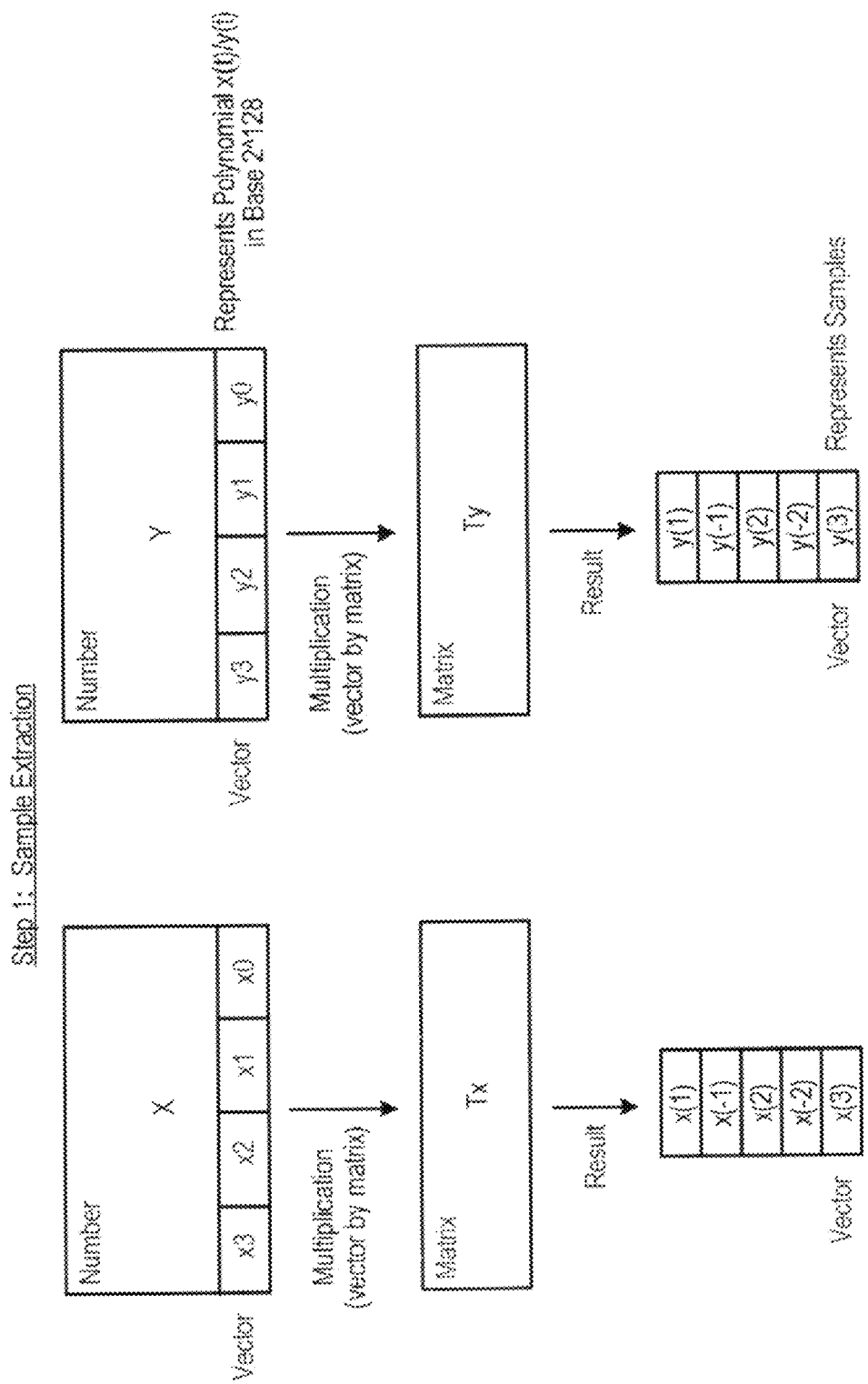
FIG. 4 is a flow chart that illustrates a sample extraction step in a one recursive level scheme of an embodiment.
Figure 5:
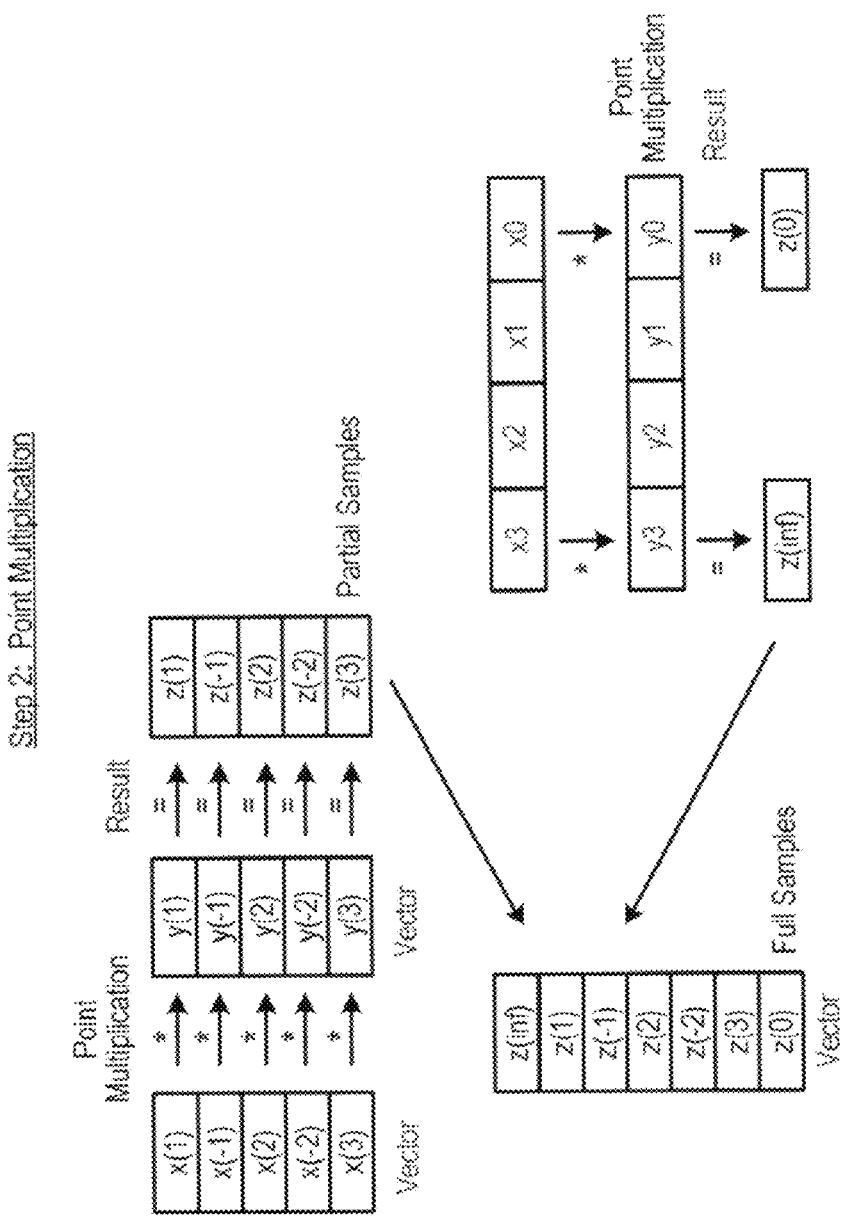
FIG. 5 is a flow chart that illustrates a point multiplication step in a one recursive level scheme of an embodiment.
Figure 6:
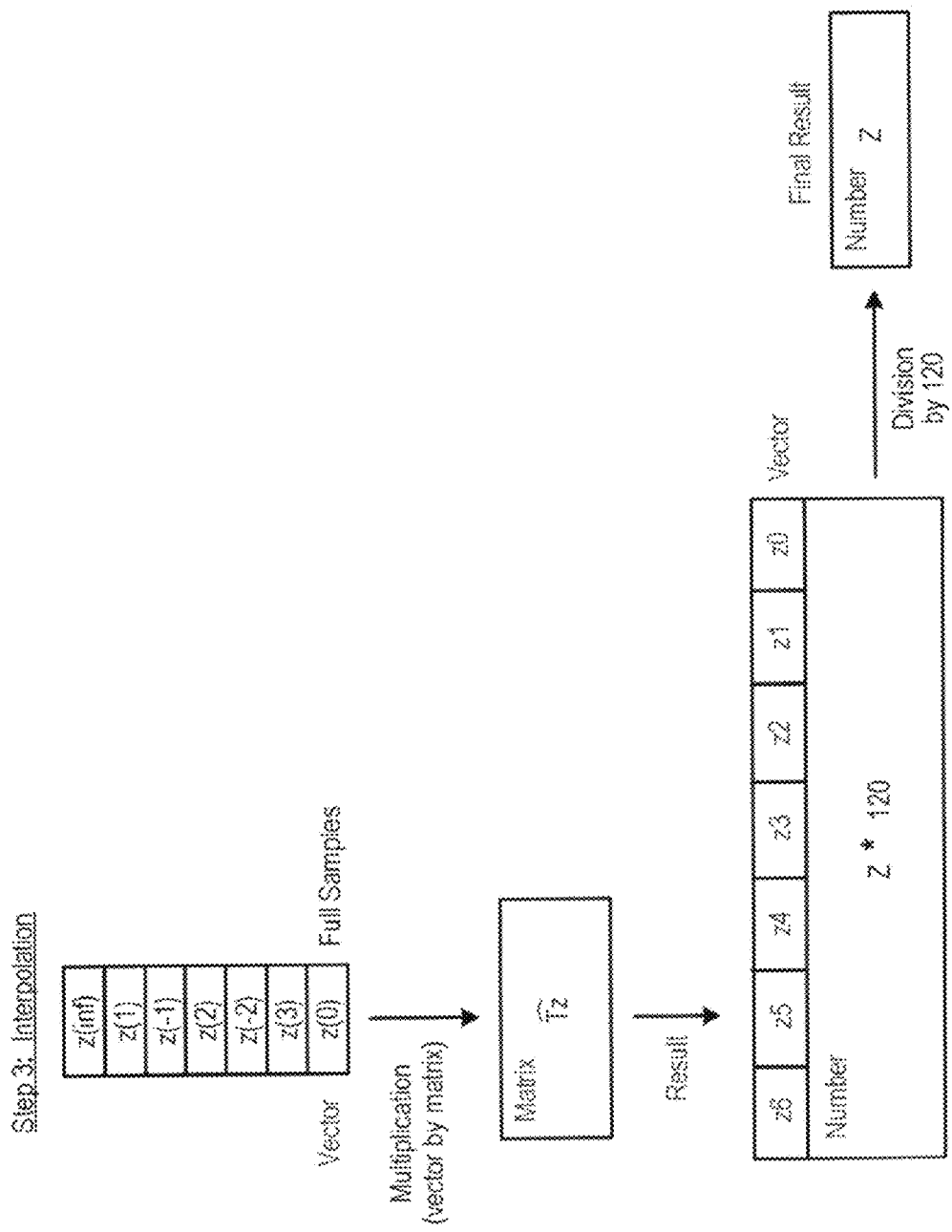
FIG. 6 is a flow chart that illustrates an interpolation step in a one recursive level scheme of an embodiment.
Figure 7:
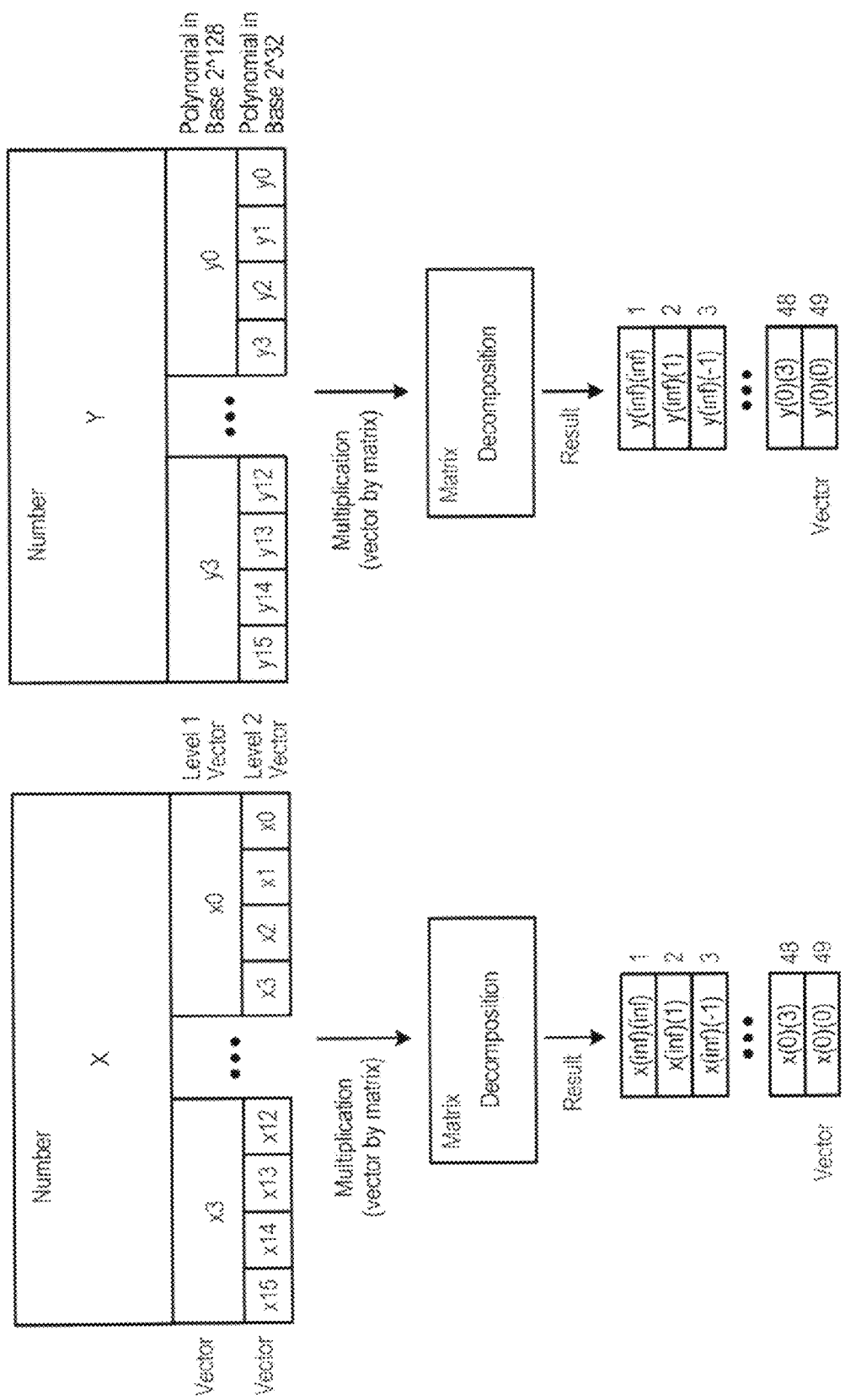
FIG. 7 is a flow chart that illustrates a sample extraction (decomposition) step in a two recursive level scheme of an embodiment.
Figure 8:
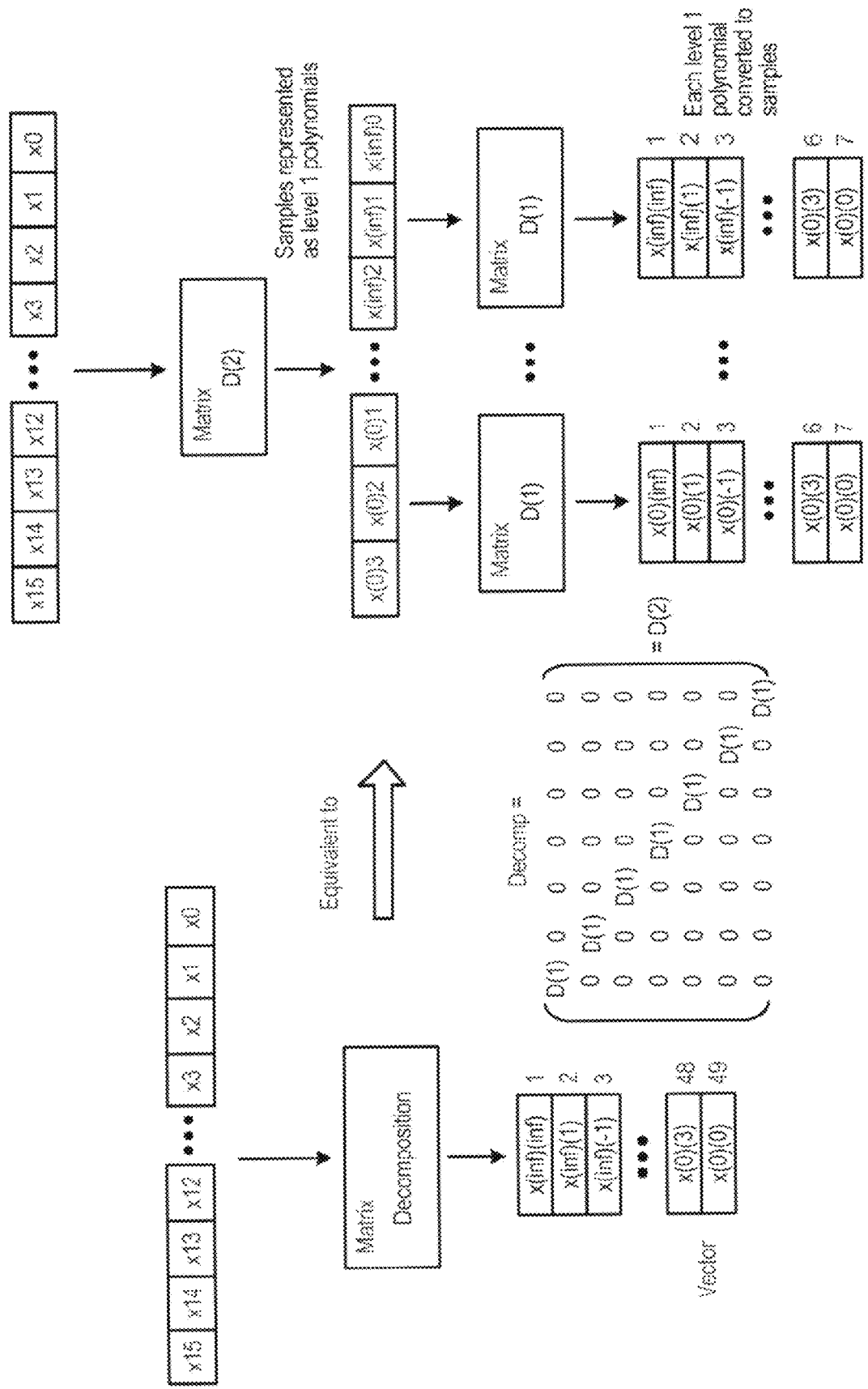
FIG. 8 is a flow chart that illustrates a sample extraction (decomposition) step in a one recursive level scheme of an embodiment.
Figure 9:
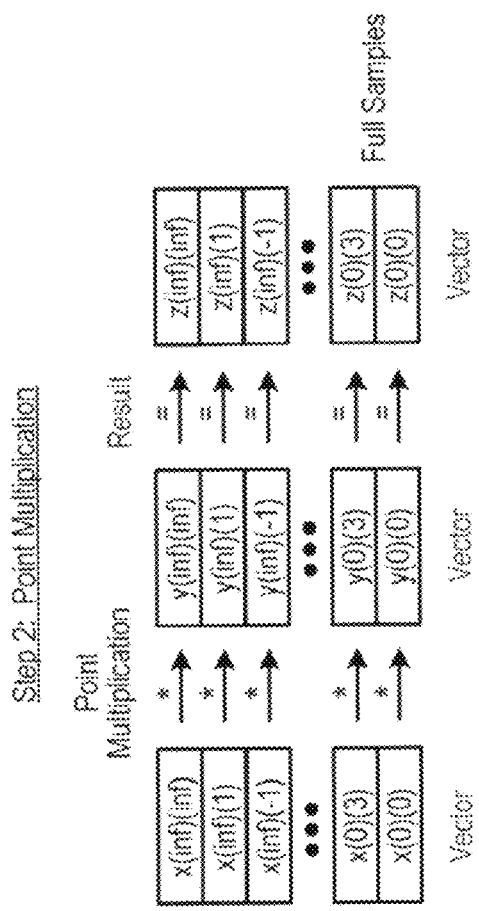
FIG. 9 is a flow chart that illustrates a point multiplication step in a two recursive level scheme of an embodiment.
Figure 10:
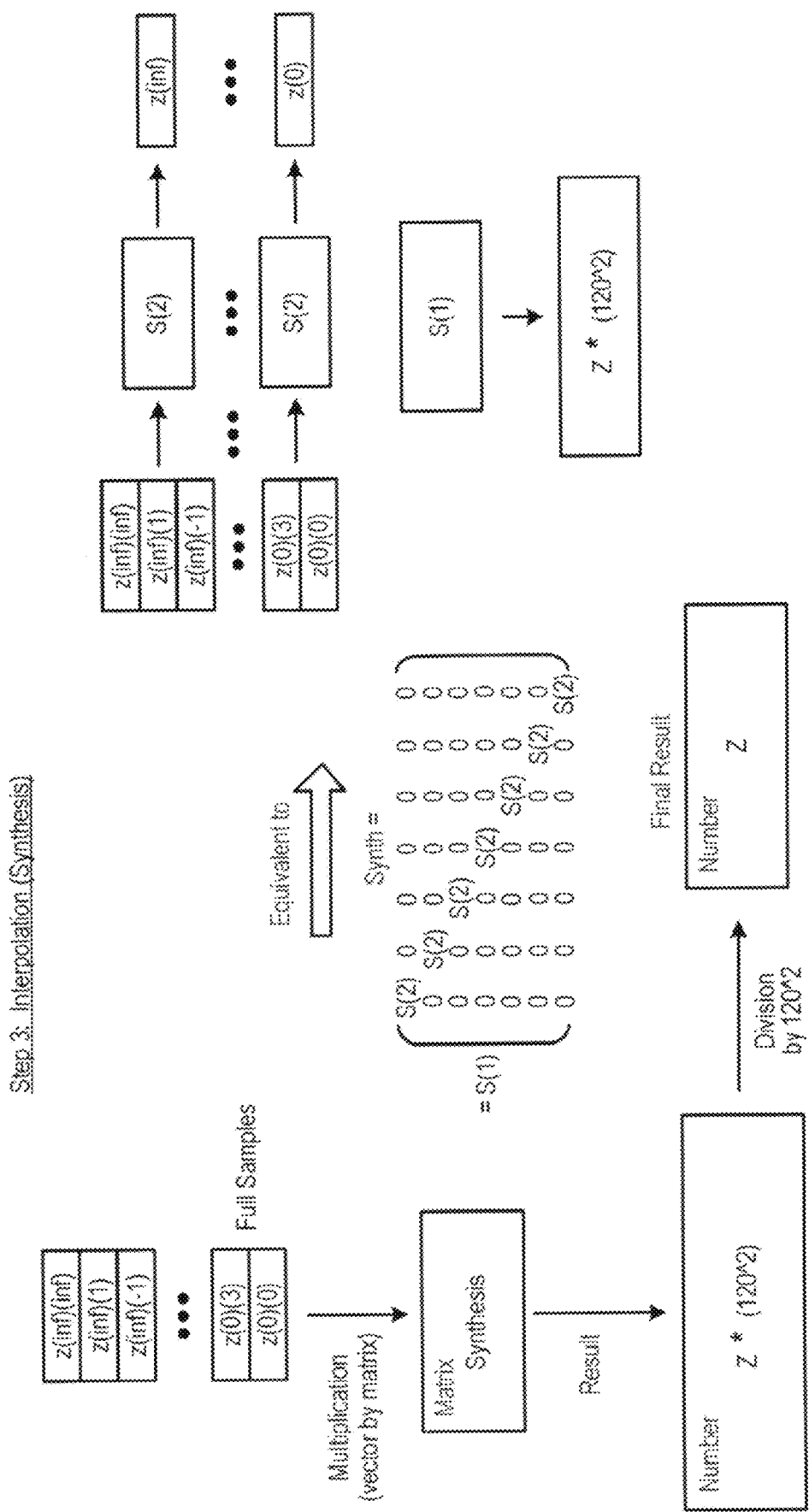
FIG. 10 is a flow chart that illustrates an interpolation (synthesis) step in a two recursive level scheme of an embodiment.

Turning again to the drawings, FIG. 4-6 are flow charts that illustrate the one recursive level scheme. These flowcharts show the general Toom-Cook algorithm with one recursion level. The specific number of parts x, y are split into, as well as the chosen sample points {1,−1,2,−2,3}, which determine the specific sizes and values of the matrices, are used as part of the 2 level scheme which is part of these embodiments.

The Two Recursion Levels Toom Cook Scheme

In another embodiment, another recursion level of Toom-Cook is added for each 128-bit multiplication, which allows 32-bit base multiplications to be used, which is much more efficient.

These two levels can be represented as:

$$x(t) =$$

$$x_{15}t^{15} + x_{14}t^{14} + x_{13}t^{13} + x_{12}t^{12} + x_{11}t^{11} + x_{10}t^{10} + x_9t^9 + x_8t^8 + x_7t^7 + x_6t^6 +$$

$$x_5t^5 + x_4t^4 + x_3t^3 + x_2t^2 + x_1t^1 + x_0t^0 = X_3w^3 + X_2w^2 + X_1w + X_0 \text{ where}$$

$$w = t^4, X_3 = x_{15}t^3 + x_{14}t^2 + x_{13}t + x_{12},$$

-continued $$X_2 = x_{11}t^3 + x_{10}t^2 + x_9t + x_8,$$

$$X_1 = x_7t^3 + x_6t^2 + x_5t + x_4, X_0 = x_3t^3 + x_2t^2 + x_1t + x_0.$$

Representing x as a four part number $x=X_3w^3+X_2w^2+X_1w+X_0$, and applying the decomposition matrix we get:

$$\begin{pmatrix} 1 & 0 & \ldots & 0 \\ & Tx & \\ 0 & \ldots & 0 & 1 \end{pmatrix} \cdot x_{coeff} = x_{samples} = \begin{pmatrix} x(w=\infty) \\ x(w=1) \\ x(w=-1) \\ x(w=2) \\ x(w=-2) \\ x(w=3) \\ x(w=0) \end{pmatrix}$$

Set $$D(1) = \begin{pmatrix} 1 & 0 & \ldots & 0 \\ & Tx & \\ 0 & \ldots & 0 & 1 \end{pmatrix} = \begin{pmatrix} 1 & 0 & 0 & 0 \\ 1 & 1 & 1 & 1 \\ -1 & 1 & -1 & 1 \\ 8 & 4 & 2 & 1 \\ -8 & 4 & -2 & 1 \\ 27 & 9 & 3 & 1 \\ 0 & 0 & 0 & 1 \end{pmatrix},$$

and note that each of $x(w=\infty)$ is actually a polynomial in degree 3 in t, and similarly $y(w=\infty)$ is actually a polynomial in degree 3 in t, thus $x(w=\infty) \cdot y(w=\infty)$ may be computed by decomposing $x(w=\infty)$, and decomposing $y(w=\infty)$ and point multiplying the coordinates of the decomposed vectors. The same applies to $x(w=1)$, $y(w=1)$, $x(w=-1) \cdot y(w=-1)$, $x(w=2)$, $y(w=2)$, $x(w=-2) \cdot y(w=-2)$, $x(w=3)$, $y(w=3)$, and $x(w=0) \cdot y(w=0)$.

The decomposition of $$\begin{pmatrix} x(w=\infty) \\ x(w=1) \\ x(w=-1) \\ x(w=2) \\ x(w=-2) \\ x(w=3) \\ x(w=0) \end{pmatrix}$$

may therefore be achieved by expanding each of the coordinates to a 4 dimensional vector and multiplying by $$\begin{pmatrix} D(1) & 0 & 0 & 0 & 0 & 0 & 0 \\ 0 & D(1) & 0 & 0 & 0 & 0 & 0 \\ 0 & 0 & D(1) & 0 & 0 & 0 & 0 \\ 0 & 0 & 0 & D(1) & 0 & 0 & 0 \\ 0 & 0 & 0 & 0 & D(1) & 0 & 0 \\ 0 & 0 & 0 & 0 & 0 & D(1) & 0 \\ 0 & 0 & 0 & 0 & 0 & 0 & D(1) \end{pmatrix}$$

However, computing the expanded vector of $$\begin{pmatrix} x(w=\infty) \\ x(w=1) \\ x(w=-1) \\ x(w=2) \\ x(w=-2) \\ x(w=3) \\ x(w=0) \end{pmatrix}$$

may be achieved if the original coefficients $X_3$, $X_2$, $X_1$, $X_0$ will each be expanded to a four dimensional vector, that is if we use the 16 coordinates $x_{15}$, $x_{14}$, ..., $x_1$, $x_0$ and the matrix $D(1)$ will be expanded to $$D(2) = \begin{pmatrix} I_4 & 0_4 & 0_4 & 0_4 \\ I_4 & I_4 & I_4 & I_4 \\ -I_4 & I_4 & -I_4 & I_4 \\ 8I_4 & 4I_4 & 2I_4 & I_4 \\ -8I_4 & 4I_4 & -2I_4 & I_4 \\ 27I_4 & 9I_4 & 3I_4 & I_4 \\ 0_4 & 0_4 & 0_4 & I_4 \end{pmatrix},$$

where $D(2)$ is derived from $D(1)$ by expanding each element of $D(1)$ to a 4×4 scalar matrix, (example $1 \to I_4$, $2 \to 2I_4$, $0 \to 0_4$).

Combining together we get the 2 level decomposition as $$x_{samples} = Decomp \cdot x_{coef}$$

$$\text{where } x_{coef} = \begin{pmatrix} x_{15} \\ x_{14} \\ \vdots \\ x_0 \end{pmatrix},$$

and Decomp is a 49×16 matrix $$Decomp = \begin{pmatrix} D(1) & 0 & 0 & 0 & 0 & 0 & 0 \\ 0 & D(1) & 0 & 0 & 0 & 0 & 0 \\ 0 & 0 & D(1) & 0 & 0 & 0 & 0 \\ 0 & 0 & 0 & D(1) & 0 & 0 & 0 \\ 0 & 0 & 0 & 0 & D(1) & 0 & 0 \\ 0 & 0 & 0 & 0 & 0 & D(1) & 0 \\ 0 & 0 & 0 & 0 & 0 & 0 & D(1) \end{pmatrix} \cdot D(2)$$

where the second matrix (on the left) is generated as a "block scalar matrix," where each block matrix on the main diagonal is the basic sampling matrix.

This matrix encapsulates the two stages of the decomposition (coefficients to samples) into one. $D(2)$ will return samples, like $D(1)$, but where $D(1)$ returns the samples as numbers, $D(2)$ returns them as vectors with four parts per number returned. Since these seven numbers are the seven samples on which we perform point multiplication, we can take each vector as an input for a multiplier, which we also do decomposition on and obtain seven samples from in order to preform another level of Toom-Cook. In total, the values change from one 16-part number (input) to seven four-part numbers (coefficients of samples) to 49 "one part" numbers (samples of samples). This is why the matrix with $D(1)$ on the diagonals is added, to perform the second level of the recursion for each of the four coefficients separately. However, by combining the operations obtained from the matrices to obtain one equivalent matrix (by computing multiplication), both levels are combined into a single operation.

One thing to note is that the conventional way to perform a two level Toom-Cook decomposition is to first perform a one level Toom-Cook decomposition, on the original number, and then to perform another one level Toom-Cook decomposition on the result of the first one level decomposition. In the matrix formulation this is equivalent to:

1) Compute $x_{sample1} = D(2) \cdot x_{coef}$, and then compute:

2)

$$x_{samples} = \begin{pmatrix} D(1) & 0 & 0 & 0 & 0 & 0 & 0 \\ 0 & D(1) & 0 & 0 & 0 & 0 & 0 \\ 0 & 0 & D(1) & 0 & 0 & 0 & 0 \\ 0 & 0 & 0 & D(1) & 0 & 0 & 0 \\ 0 & 0 & 0 & 0 & D(1) & 0 & 0 \\ 0 & 0 & 0 & 0 & 0 & D(1) & 0 \\ 0 & 0 & 0 & 0 & 0 & 0 & D(1) \end{pmatrix} x_{sample1}$$

Our approach allows to compute (offline) the first decomposition matrix Decomp given above, and then compute directly $x_{samples}$ as a product $$x_{samples} = Decomp \cdot x_{coef}$$

For y we would typically do a similar process and compute a second decomposition matrix $Decomp_y$, but typically the first and second decomposition matrices will be equal.

Actually this is an implementation of the associate law which is satisfied by matrix multiplication and is expressed as $A(BC) = (AB)C$ for any 3 matrices A, B, C for which the products AB, and BC are defined.

Our approach has distinct advantages as for example it allows to compute directly the contribution of each of the coefficients of x, to each of the samples.

One embodiment uses one equivalent operator in two level Toom-Cook, derived as described above. The actual operation performed is thus:

$$Decomp * x_{coef} = Decomp * \begin{pmatrix} x_{15} \\ x_{14} \\ \ldots \\ x_0 \end{pmatrix} = x_{samples}$$

where the decomposition matrix is used instead of Tx, which was used in the one-level scheme (the usage of a single matrix operator is the same).

(3) The processor then computes the samples of z by point multiplication of the samples of x and y. Note that with the two recursion level scheme, there are seven level-one samples (numbers) obtained for each of the seven level-two samples (which are vectors) to calculate. So, there are 49 samples:

$$x_{samples} = \begin{pmatrix} x(\infty)(\infty) \\ x(\infty)(1) \\ x(\infty)(-1) \\ \ldots \\ x(0)(-2) \\ x(0)(3) \\ x(0)(0) \end{pmatrix}$$

Therefore, there are 49 multiplication of ~32 bits, instead of seven multiplications of 128 bits:

$$z(t) = x(t) * y(t) \rightarrow \begin{pmatrix} z(\infty)(\infty) \\ z(\infty)(1) \\ z(\infty)(-1) \\ \ldots \\ z(0)(-2) \\ z(0)(3) \\ z(0)(0) \end{pmatrix} = \begin{pmatrix} x(\infty)(\infty) * y(\infty)(\infty) \\ x(\infty)(1) * y(\infty)(1) \\ x(\infty)(-1) * y(\infty)(-1) \\ \ldots \\ x(0)(-2) * y(0)(-2) \\ x(0)(3) * y(0)(3) \\ x(0)(0) * y(0)(0) \end{pmatrix}$$

(4) Synthesis: the synthesis stage is expressed as one matrix.

$$S(1) = (2^{768}\; 2^{640}\; 2^{512}\; 2^{384}\; 2^{256}\; 2^{128}\; 2^0) * \overset{\text{def}}{=}$$

where $\overset{\text{def}}{=}$ was defined in the one-level scheme as the matrix converting from samples to coefficients:

$$z_{coeff} \overset{\text{def}}{=} * z_{samples}$$

and we combine it with the substitution matrix to also convert from coefficients to a numerical result (for parts of size 128 bit):

$$z = S(1) * z_{samples}$$

S(1) was used in the one-level recursion, and here S(2) is defined based on S(1) but with substitution for base=2^32 instead of 2^128 (for smaller parts of size 32 bit):

$$S(2) = (2^{196}\; 2^{160}\; 2^{128}\; 2^{96}\; 2^{64}\; 2^{32}\; 2^0) * \widetilde{T}_z$$

The full synthesis matrix is then:

$$synth = S(1) * \begin{pmatrix} S(2) & 0 & 0 & 0 & 0 & 0 & 0 \\ 0 & S(2) & 0 & 0 & 0 & 0 & 0 \\ 0 & 0 & S(2) & 0 & 0 & 0 & 0 \\ 0 & 0 & 0 & S(2) & 0 & 0 & 0 \\ 0 & 0 & 0 & 0 & S(2) & 0 & 0 \\ 0 & 0 & 0 & 0 & 0 & S(2) & 0 \\ 0 & 0 & 0 & 0 & 0 & 0 & S(2) \end{pmatrix}$$

The first synthesis matrix (right) is generated as a "block scalar matrix," where each block matrix on the main diagonal is the basic synthesis matrix.

The synthesis is performed in the opposite direction comparing to the decomposition. Like in the decomposition stage, each first take groups of samples (seven in each group) and use S(2) to get one number from each group (the "level one" sample), and then use S(1) on all samples to get the final result for the number z (49 samples of samples, transformed to seven samples, transformed to one result).

The full synthesis matrix is a vector with 49 values, each comprised of sums of small numbers multiplied by powers of two (example value: $5*2^{32}-7*2^{96}+11*2^{160}+\ldots$). In the hardware implementation, small multiplications by constants followed by shift and summations are used.

Moreover, looking at synthesis using the matrix $\widetilde{T}_z$ each column of the matrix can be associated with a power of two/shift amount. We can, therefore, compute the contribution (weight) of each of the products of the point multiplication i=1 ... 49 to each of the coordinates (bit range) of z. This results in a (square) matrix, where each of the columns of the matrix represents a coordinate j of z, and the column contains the weights of all point multiplication according to their contribution to $z_j$.

Computation of the z synthesis may proceed by assigning a register to the end result. Each of the columns of this matrix can be computed in a separate register and added to the end-result-register with the corresponding shift after all contributions to the column have been computed. Each column can be bounded from above, which can be used to limit the number of bits assigned to each column. Also, each column is non-negative, so we may ignore overflows and negative results in intermediate computations. Preferably, each column would be added to the end-result-register only after all contributions to the column were added.

(5) The result obtained is $x*y*120^2$, (since both S(1) and S(2) add a 120 factor), and a division by $120^2$ is needed next. In our case, $120^2 = 2^6*3^2*5^2$, so the division is by a relatively-small number and can be expressed as dividing by $2^6$, which is just shifting six bits to the right, followed by division of $3^2*5^2 = 15^2$.

FIGS. 7-10 are flow charts that illustrate the two recursive level scheme.

The General Case: Toom-Cook with m-Partition and i Recursion Levels

In another embodiment, the scheme for Toom-Cook with four partitions and one or two recursion levels can be generalized while using one decomposition and one synthesis matrix.

The partition to m parts, which is determined by the base matrices d(1) and s(1), can be achieved by choosing an ample amount of samples of x, y for z interpolation (where the sample amount should be equal to the degree of z). The base matrices can then be obtained by the method similar to before:

$$D(1) = \begin{pmatrix} 10 & \ldots & 0 \\ t_1^{dx} & \ldots & t_1^0 \\ \vdots & \ddots & \vdots \\ t_{dz-1}^{dx} & \ldots & t_{dz-1}^0 \\ 0 & \ldots & 01 \end{pmatrix}$$

where $t_1, \ldots, t_{dz-1}$ correspond to the sample points (which should be small), not including infinity and zero (first and last row), which are always chosen. dx, dz are the degrees of x and z polynomials, and it holds dx=dy, dx+dy=dz (in our example of four parts, $x^3$ is the highest power and so dx=3, dz=6 and so we need for dz-1=5 sample point except infinity and 0). It also holds that if dx=dy=m-1, dz=2m-2, so, in the general case, we have m coefficients of x, y, and 2m-1 samples are needed to interpolate z.

The point multiplication is the same (each x sample is multiplied by a y sample using base multipliers) except for different number of sample points (dz+1=2m-1), and the size of each multiplication (~512/m).

As for synthesis:

$$Tz = \begin{pmatrix} t_1^{dz} & \ldots & t_1^0 \\ \vdots & \ddots & \vdots \\ t_{dz-1}^{dz} & \ldots & t_{dz-1}^0 \end{pmatrix}$$

$$\widetilde{T}_z = const *$$

$$\begin{pmatrix} 1 & 0 \ldots & 0 \\ 0_{dx-1X1} & Tz^{-1} & 0_{dz-1X1} \\ 0 & 0 \ldots & 1 \end{pmatrix} \begin{pmatrix} 1 & 0 \ldots & 0 \\ -Tz(:,1) & ID_{dz-1Xdz-1} & -Tz(:,dz+1) \\ 0 & 0 \ldots & 1 \end{pmatrix}$$

where the matrix $\widetilde{T}_z$ for interpolation is now dependent on the new Tz and the chosen sample points, and the constant is determined such that $\widetilde{T}_z$ has whole coefficients (due to attributes of Tz, it is expected that the constant will still be comprised of small prime factors, allowing efficient division).

Finally, the synthesis matrix is:

$$S(1) = (2^{(512/m)*dz} \ldots 2^{(512/m)+2} \, 2^{512/m} \, 2^0) * \widetilde{T}_z$$

since we partition into groups of 512/m bits.

These matrices can then be used as a basis for any number of recursion levels i:

General Decomposition:

D(i) is defined as D(1), where each value t is substituted by a $m^{i-1} \times m^{i-1}$ block, with value $t*I_{m^{i-1}}$ (for example, with two recursion levels and four parts the obtained block is for $4^{2-1}=4$, $t*I_4$). Alternatively, D(i) is defined as D(i−1), where each value t is substituted by a m x m block with value $t*I_m$.

For example:

$$D(1) = \begin{pmatrix} a & \ldots & b \\ \vdots & \ddots & \vdots \\ c & \ldots & d \end{pmatrix} \rightarrow D(i) = \begin{pmatrix} aI_{m^{i-1}} & \ldots & bI_{m^{i-1}} \\ \vdots & \ddots & \vdots \\ cI_{m^{i-1}} & \ldots & dI_{m^{i-1}} \end{pmatrix}$$

The full decomposition matrix is then:

$$Decomp = \begin{pmatrix} D(1) & \ldots & 0 \\ \vdots & \ddots & \vdots \\ 0 & \ldots & D(1) \end{pmatrix} * \ldots * \begin{pmatrix} D(i-1) & \ldots & 0 \\ \vdots & \ddots & \vdots \\ 0 & \ldots & D(i-1) \end{pmatrix} * D(i)$$

where all matrices are diagonal by blocks, the leftmost has $(dz+1)^{i-1}$ blocks on the diagonal, second leftmost has $(dz+1)^{i-2}$, and so on.

As emphasized above, this approach allows to first compute (offline) the matrix Decomp given above, and then compute directly $x_{samples}$ as a product, and the contribution of each original coefficient of x to each sample of x clearly appears in the matrix, and can be computed immediately following the acquisition of the coefficient.

Point multiplication is the same, for $(dz+1)^i=(2m-1)^i$ points with multiplication size $512/m^i$.

As for synthesis:

$$S(i) = \left( 2^{(512/m^i)*dz} \ldots 2^{(512/m^i)*2} \, 2^{512/m^i} \, 2^0 \right) * \widetilde{T}_z$$

$$Decomp = S(1) * \ldots * \begin{pmatrix} S(i-1) & \ldots & 0 \\ \vdots & \ddots & \vdots \\ 0 & \ldots & S(i-1) \end{pmatrix} \begin{pmatrix} S(i) & \ldots & 0 \\ \vdots & \ddots & \vdots \\ 0 & \ldots & S(i) \end{pmatrix}$$

where all matrices are diagonal by blocks, the rightmost has $(dz+1)^{i-1}$ blocks on the diagonal, second rightmost has $(dz+1)^{i-2}$, and so on.

Figure 11:
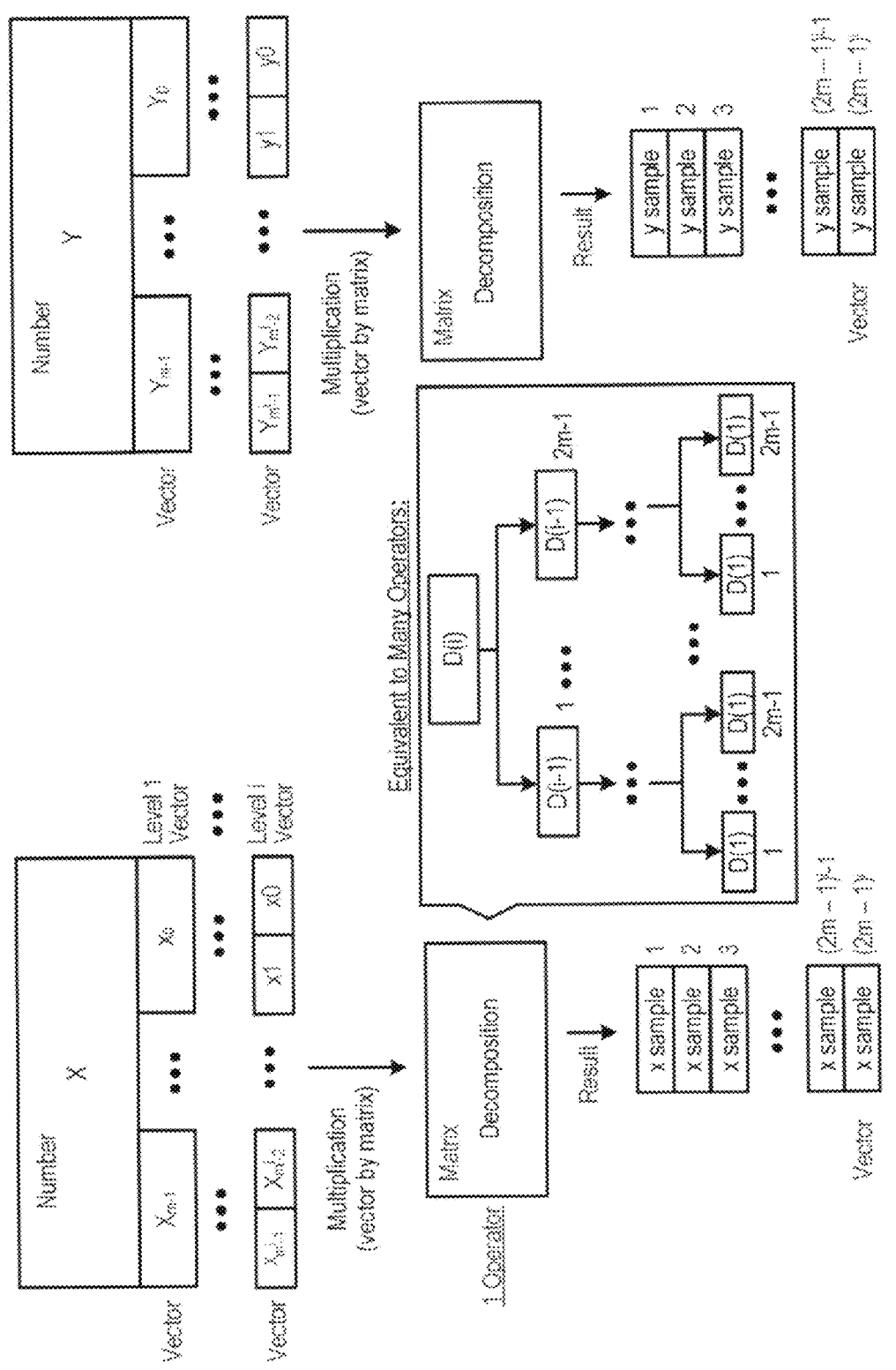
FIG. 11 is a flow chart that illustrates a sample extraction (decomposition) step of an embodiment.
Figure 12:
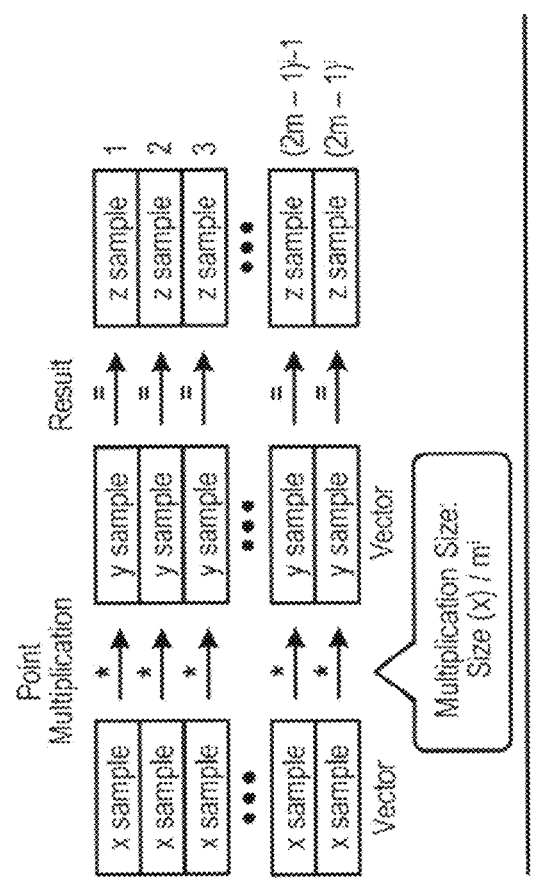
FIG. 12 is a flow chart that illustrates a point multiplication step of an embodiment.
Figure 13:
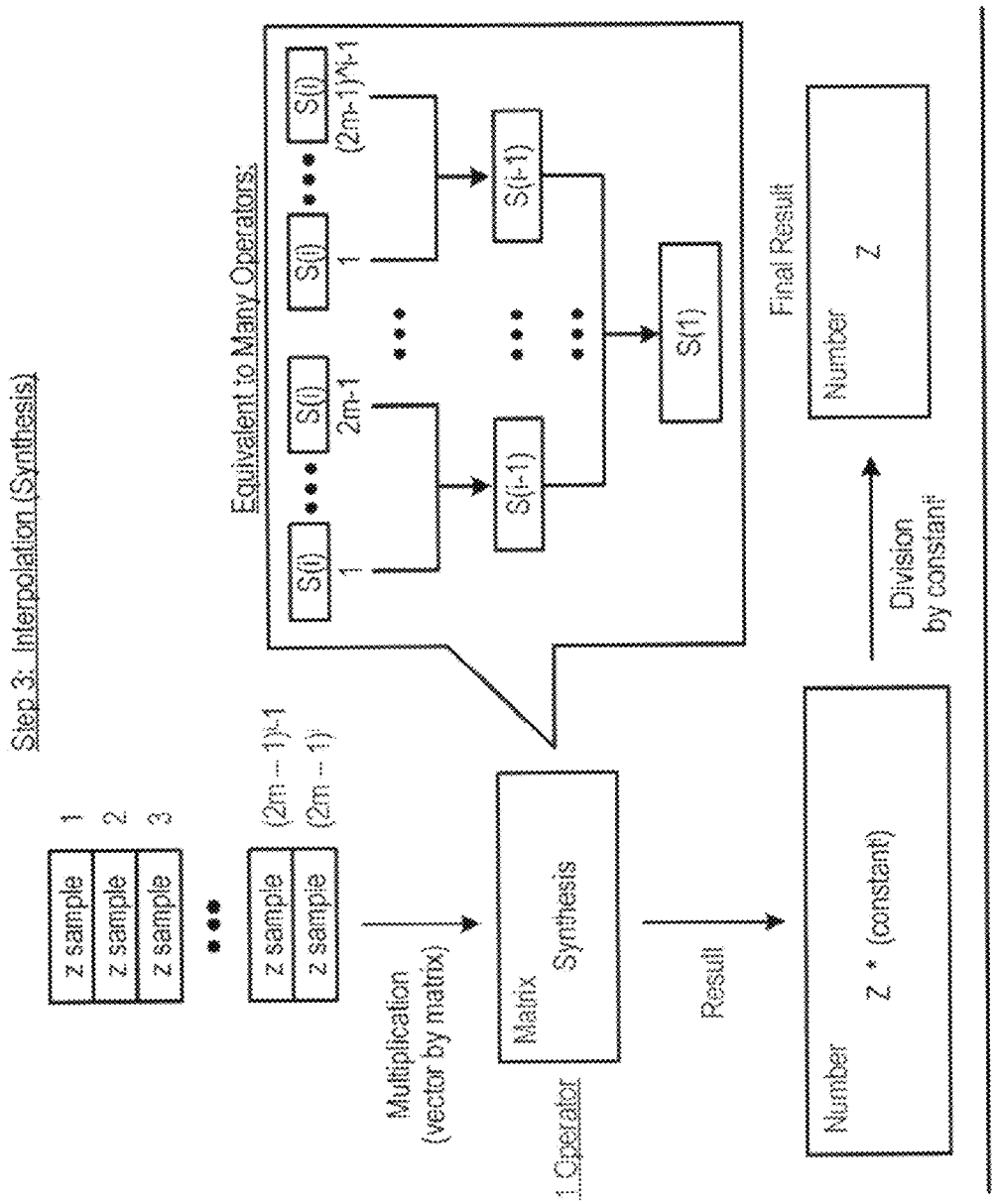
FIG. 13 is a flow chart that illustrates an interpolation (synthesis) step of an embodiment.

Finally, we now need to divide the final result by $const^i$ (which can still be done efficiently if const is comprised of small primes). FIGS. 11-13 are flow charts that illustrate the above processes.

The Final Stage Division by 15 or 15^2 Using Lookup Tables

Figure 14:
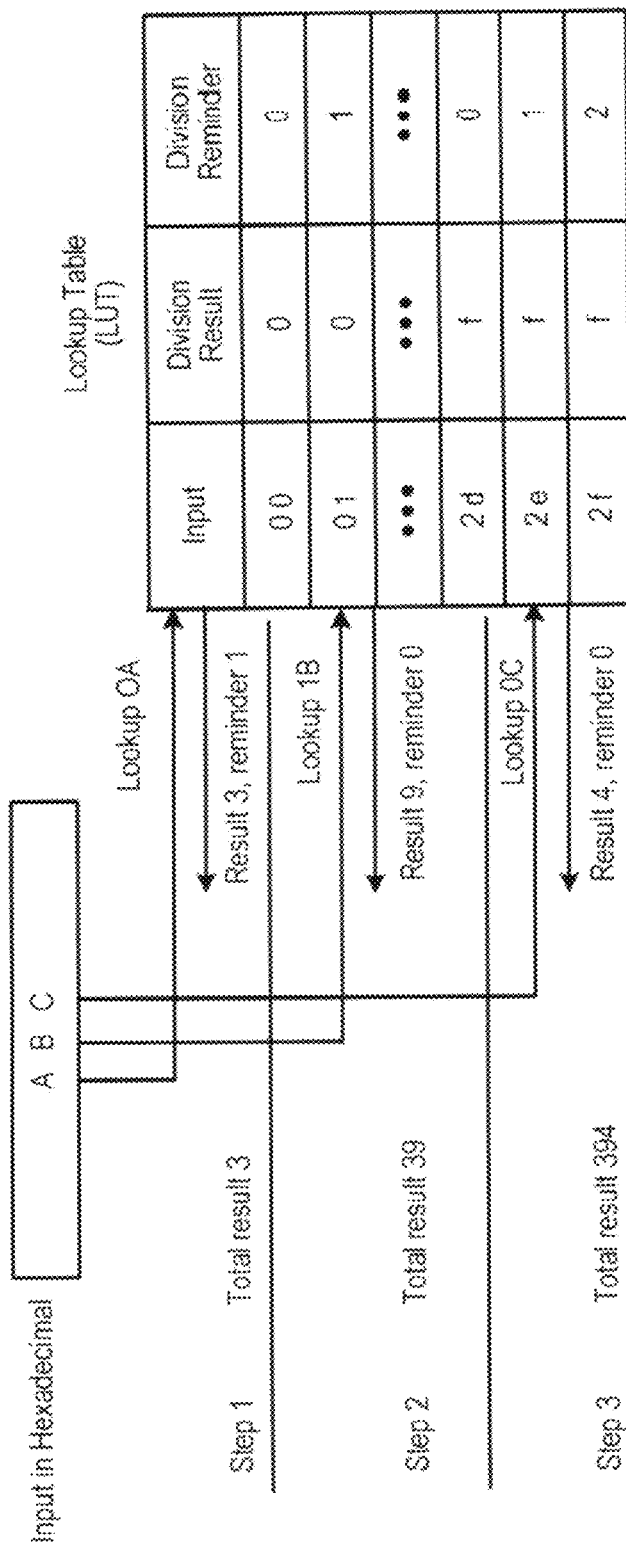
FIG. 14 is an illustration of a division process of an embodiment.

Another embodiment recognizes that since the divisor is both constant, small, and comprised of very small prime factors ($3^2*5^2$ in the case of a four-part two-level Toom-Cook), the division can be performed more efficiently with exhaustive lookup tables (LUTs). In this embodiment, a small table is prepared in advance for every possible value (from a small set), where the division result and the remainder are stored. Using hexadecimal numbers (groups of four bits), we can calculate long division with a LUT using the following method. First, the processor goes over each digit of the input number (in hex, four bits) and concatenates to the previous remainder. Next, the processor gets the division result and adds the remainder of the current number by 3/5/15 etc. from the lookup table. Then, the processor adds the result digit to the end of the result, saving the remainder for the next iteration. An example of this is shown in FIG. 14.

Each iteration, the algorithm only concatenates and accesses small, fast memory, so many iterations can be done in a single clock cycle, by making serial hardware, which has an input of several digits, and by passing the remainder from one iteration to the next to start the next lookup within the same clock cycle. In hex, the number of iterations is 512/4 (one iteration per four-bit group). The LUT size depends on the divisor (for three, the remainder is 0 to 2, so values are 00 to 2f, 16*3 values). Similarly, for five divisor, 16*5 values, and for 15 divisor, 15*16 values. If instead of hex, base $2^b$ is used, the number of iterations can be reduced to 512/b, but the required memory for 3, 5, and 15 LUTs changes to $3*2^b$, $5*2^b$, $15*2^b$ respectively. Therefore, use of a LUT is efficient since the table size is proportional to the size of the divisors, and our use of small, cleverly-chosen samples in the Toom Cook multiplier begets a small divisor comprised of very small prime divisors.

The LUT size can be further reduced by only saving LUTs of smaller divisors (when dividing by 15, these are three and five, and when dividing by $15^2$, these can be 3, 5, 15 or other combinations (like 9 and 5)). When several divisions are required, the full division can be done in a pipeline, where the division result of the next digit is passed as an input to the next LUT divider on the next iteration. Thus, the result can be obtained using smaller, more memory efficient LUTs while only adding a small increase in latency.

One embodiment optimizes this method to be performed in parallel to the computation of the Toom-Cook result. Where the Toom-Cook method can prioritize calculating any bits of the results first (by calculating the required point multiplication, which contribute to the result within the bit range in earlier clock cycles), by calculating the result from the most-significant bit (msb) to the least-significant bit (lsb), the division of the first group of bits can begin as soon as they are calculated, and division can continue in parallel to the multiplication while subsequent bits of the multiplication result are provided.

Another option for optimization can reduce the number of iterations to $512/2^{b+1}$ (half of the previous method) without additional LUT memory and can be performed by calculating the division from msb to middle and from middle to lsb in parallel, while assuming that the first remainder of the lsb part was zero. If the remainder was not zero, the method can save the value of $$\frac{remainder * 2^{257}}{t}$$

for t=15 or t=$15^2$ (remainder is at the msb of the number, so the difference between the divided number and the actual value, which should be divided is remainder*$2^{257}$, which is then divide by 15), and the value is added to the result with simple addition, to fix the result.

Montgomery Modular Multiplication

In many cryptographic applications, the multiplication should be computed modulus n (for some large odd or prime n). This can be done by computing the modulus after the multiplication, but it would be more efficient to use methods computing the multiplication and modulus together.

The Montgomery scheme described below is one such way to improve efficiency of computing the modulus. In a Montgomery multiplier, we want to compute x·y mod n, where n is any large odd integer.

$$R \stackrel{\text{def}}{=} 2^{\lceil log2n \rceil}, (\text{so } R/2 < n < R).$$

The Montgomery multiplier computes x·y·R mod n, by computing the first inputs in the montgomery plane:

$$\bar{x} = xR \bmod n$$

$$\bar{y} = yR \bmod n$$

It then computes all multiplications such that the result is also in the Montgomery plane:

If z=x·y mod n, then $\bar{z}$=x·y·R mod n=$\bar{x}·\bar{y}·R^{-1}$ mod n

Finally, after all multiplications, the result can be transformed from the Montgomery plane to normal mod N, by multiplying by $R^{-1}$.

A mathematical analysis of how practical Montgomery is derived is provided below. In practice, Montgomery is computed as follows: pre-compute $w \stackrel{\text{def}}{=} -n^{-1}$ mod R, and proceed by:
(1) Compute $\overline{xy}=\bar{x}·\bar{y}$ mod R, (i.e. take the $\log_2$ R LSB-s of $\bar{x}·\bar{y}$).
(2) Compute t=$\overline{xy}$·w mod R.
(3) Compute z=$\bar{x}·\bar{y}$+t·n
(4) Compute $\bar{z}$=z/R=z>>($\log_2$ R).
(5) if $\bar{z}$>n, $\bar{z}$=$\bar{z}$−n; end This option requires two multiplications ($\bar{x}·\bar{y}$, t·n) of integers of length $\log_2$ R bits which produce a result of length 2·$\log_2$ R bits, and one multiplication, ($\overline{xy}$·w mod R), which only needs to compute the $\log_2$ R LSB-s of the product. Note that $\bar{x}$, $\bar{y}$≤n, t<R, so $\bar{x}·\bar{y}$+t·n<n(n+R)<2nR.

Using the general Montgomery scheme, which relies on any multiplication method, the proposed Toom-Cook scheme may be used to compute the required multiplication, using the improved performance of Toom-Cook to further improve the Montgomery scheme. Since the Montgomery scheme uses only multiplications, additions, and shifts (the latter two being cheap and efficient in hardware), by optimizing the Toom-Cook multipliers for the specific multiplication required in the scheme, performance can be even further improved.

Observing the practical Montgomery scheme, three serial multiplications must be performed (each is dependent on the previous result): $\bar{x}·\bar{y}$, $\overline{xy}$·w mod R, t·n. However, looking in more detail, the second multiplication $\overline{xy}$·w mod R is dependent only on the lower $\log_2$ R bits of $\bar{x}·\bar{y}$. Therefore, the second multiplication can start its calculation as soon as the lower $\log_2$ R bits are computed and also can need only calculate the $\log_2$ R lower bits of its result (the rest are never used).

Therefore, in one embodiment, a new, mod R optimized Toom-Cook multiplier is used where multiplication is performed from to lsb to the msb, calculating the lower bits of the result first to speed up the full Montgomery scheme. This proposed Toom-Cook multiplier differs from the normal output scheme described previously, where multiplication order was msb to lsb, to allow parallelization with division. A more advanced scheme can start the computation from the $\log_2$ R rightmost bit, to the lsb, and then compute the remaining bits from the msb to the $\log_2$ R rightmost bit. Thus, parallel computation can be achieved while still being optimized for mod R multiplication.

The Montgomery scheme uses a combination of the proposed normal output Toom-Cook multiplier (msb to lsb) and the mod R optimized variant to maximize the performance of the scheme, by using each variant depending on the specific multiplication (the first two use the mod R variant and the last uses the normal variant).

There are several advantages associated with these embodiments. For example, for large number multiplication, the Toom-Cook scheme with four parts and two recursion levels presents many advantages over previous approaches, as it presents faster and more-efficient multiplication hardware than a normal hardware multiplier (which is very inefficient for large numbers). By converting the large multiplication into many multiplications of smaller numbers (e.g., from 512 bits to 32 bits), the multiplications can be done much faster, and the combination of the results using shifts, additions, and multiplications by small constants to obtain the final result is cheap and efficient in hardware.

Toom-Cook is also more efficient than a Karatsuba multiplier, which only splits each number into two parts and, thus, requires many recursion levels to achieve sufficiently-small base multiplications, as in Toom-Cook. Adding these recursion levels comes with a higher computation complexity in hardware and makes the hardware less feasible to design in practice. Moreover, the inclusion of the required division of the result using fast, simple hardware operations (LUT lookup) in parallel to the multiplication allows the full Toom-Cook operation to be implemented in practical hardware fully and without the performance hit obtained from division usually. This makes the usage of Toom-Cook in hardware practical, as previous attempts for Toom-Cook in hardware were hindered by the need for division hardware in the scheme, which generally can be slow and costly.

The proposed division in these embodiments further conserves LUT memory usage through the addition of a pipeline, saving only LUTs of small numbers and decreasing the cost of the division hardware. The efficient division of the result (acquired due to use of inverse matrices and the need to obtain bit exact results) is possible due to the constant that the result is multiplied by being a small number (e.g., 120^2) comprised of small prime factors (e.g., three and five ignoring powers of two which can be divided by shifts). The constant obtained is indeed small due to the initial smart choice of the sample points.

The proposed matrix approach to the Toom-Cook calculation, as well as the derivation of the required matrices for any number of parts/coefficients per level and any number of recursion levels, allows fast and simple design of different Toom-Cook multipliers with different parameters, which in turn allow many different Toom-Cook hardware variations to be developed and compared to further optimize the cost and efficiency of the chosen solution. The minimization of the full decomposition and synthesis stages of the operation into one matrix multiplication each allows treating each as a single operation, which can be heavily optimized for performance.

There are also several advantages over using the Karatsuba method. For example, the Karatsuba method involves a layered approach where each layer may be computed after the proceeding upper layer was computed. Also, in the synthesis phase, a similar layered approach is applied, and each layer may be computed only after the proceeding lower layer was computed. In contrast, these embodiments compute the decomposition by a matrix, which is the product of the matrices for each layer. Once the decomposition matrix, which is a fixed matrix and is computed offline by multiplying together all the decomposition matrices of each layer, is obtained, the decomposition can be computed regardless of the layers. Whenever a portion of x is received, the controller determines how it will appear in each coordinate of the output of the decomposition. So, the portion of x can be added with the correct linear combination coefficient to each output coordinate (it is very possible that some coordinates will not contain the portion (i.e., that the coefficient for such coordinates is 0)). So, these embodiments allow the linear combination to be computed for each sample of x for each of the samples without having to wait for the layers to compute layer after layer. And the same applies for y.

After decomposing both x and y, the system point-multiplies the coordinates of the output of the decomposition matrix and then starts the synthesis process. The system does not have to wait for the decomposition to end and may start computing point-multiplication at any time there are enough samples of x and y that contribute to an output of the decomposition matrix. This is different from prior methods which compute the synthesis in a bottom-up fashion where the lower levels are synthesized first and each layer must wait until the proceeding lower layer was computed. Again, the prior methods compute layer after layer, while this embodiment does not need to wait for the previous layers to be computed before computing the current layer. In fact, these embodiments do not work by layers but can compute by bit significance. For example, in some cases, the system may compute the product from most-significant bit to least-significant bit, while, in other cases, the system may do the opposite and compute the product from least-significant bit to most-significant bit.

In one embodiment, the system computes a synthesis matrix as a product of the synthesis at all layers, so the system knows exactly where each of the products should be included and what its coefficient is, so the system does not have to wait for the layers to be completed. Once the system has a product of two coordinates of x and y, the system can immediately add its contribution of each of the coordinates of the product for which it contributes.

Further, as discussed below, in one embodiment, the system uses a modulo operation as an integral part of the multiplication, which can speed the multiplication. In some cases, the system computes the multiplication from most-significant bit to least-significant bit in order to perform an approximate modulo and remove a number of most-significant bits from the intermediate result, thus allowing for faster computation with shorter integers.

Figure 15:
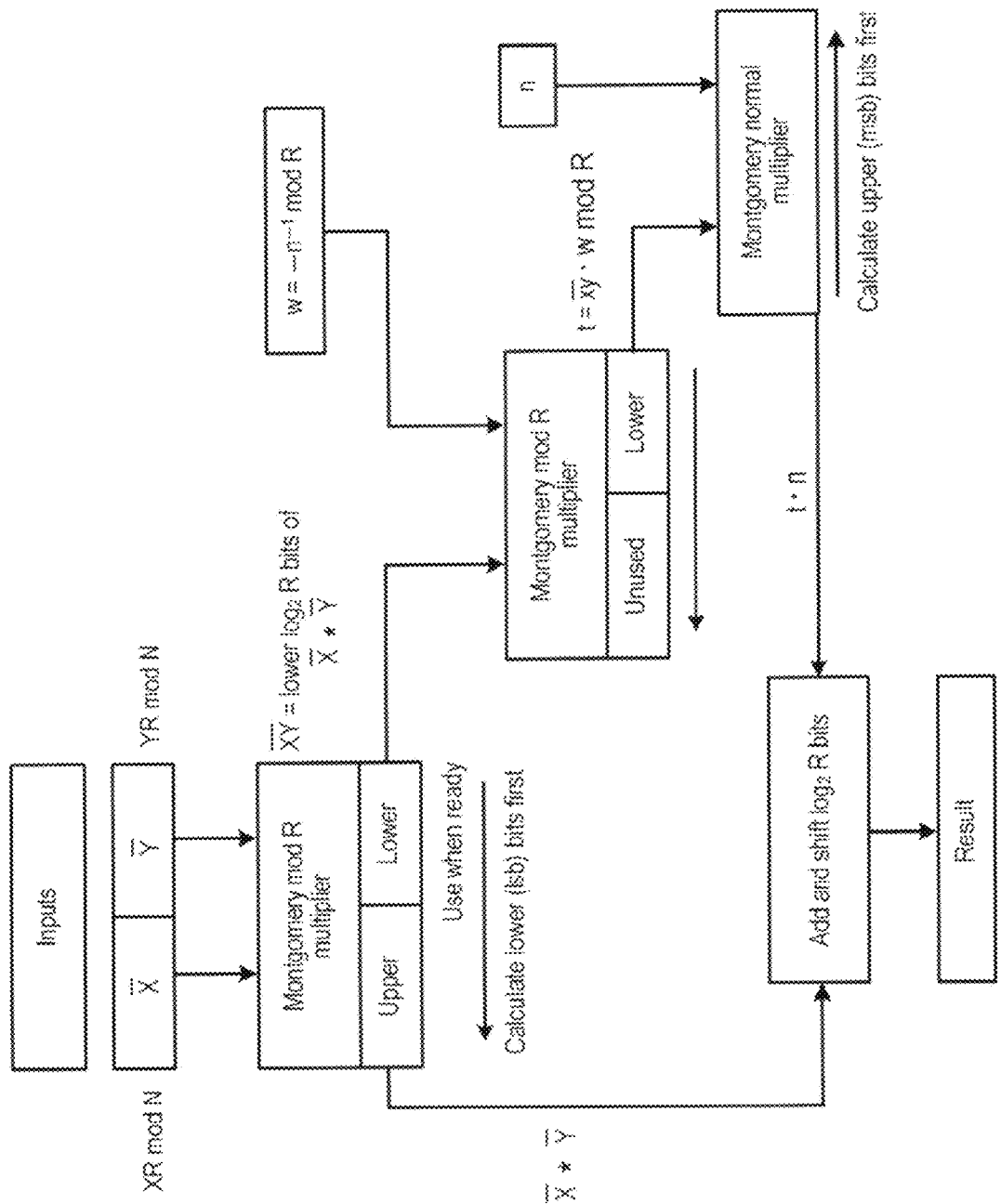
FIG. 15 is a flow chart of a Montgomery scheme of an embodiment.

More specifically, the combination of Montgomery modular multiplier with Toom-Cook allows calculation of the result mod n efficiently, while saving both the cost of regular modulo operation and the cost of multiplication within the Montgomery scheme. Furthermore, the design and usage of special variants of Toom-Cook hardware for usage in Montgomery allows far reaching optimization of every part of the Montgomery operation, achieving a total design with a very optimized modular multiplier, which is fast and efficient. FIG. 15 illustrates a Montgomery scheme of an embodiment.

The following paragraphs provide additional information on the specific values used in an embodiment in Toom-Cook with one level and four parts. For sample points $\{1,-1,2,-2,3\}$:

Coefficient to sample matrices:

$$Tz = \begin{pmatrix} 1^6 & \cdots & 1^0 \\ \vdots & \ddots & \vdots \\ 3^6 & \cdots & 3^0 \end{pmatrix} = \begin{pmatrix} 1 & 1 & 1 & 1 & 1 & 1 & 1 \\ 1 & -1 & 1 & -1 & 1 & -1 & 1 \\ 64 & 32 & 16 & 8 & 4 & 2 & 1 \\ 64 & -32 & 16 & -8 & 4 & -2 & 1 \\ 729 & 243 & 81 & 27 & 9 & 3 & 1 \end{pmatrix}$$

$$Tx = Ty = \begin{pmatrix} 1^3 & \cdots & 1^0 \\ \vdots & \ddots & \vdots \\ 3^3 & \cdots & 3^0 \end{pmatrix} = \begin{pmatrix} 1 & 1 & 1 & 1 \\ -1 & 1 & -1 & 1 \\ 8 & 4 & 2 & 1 \\ -8 & 4 & -2 & 1 \\ 27 & 9 & 3 & 1 \end{pmatrix}$$

$$Tx * x_{samp} = \begin{pmatrix} 1 & 1 & 1 & 1 \\ -1 & 1 & -1 & 1 \\ 8 & 4 & 2 & 1 \\ -8 & 4 & -2 & 1 \\ 27 & 9 & 3 & 1 \end{pmatrix} \begin{pmatrix} x_0 \\ x_1 \\ x_2 \\ x_3 \end{pmatrix} = \begin{pmatrix} x(1) \\ x(-1) \\ x(2) \\ x(-2) \\ x(3) \end{pmatrix}$$

Sample to coefficient matrices:

$$substraction \text{ matrix} = \begin{pmatrix} 1 & 0 \cdots & 0 \\ -Tz(:,1) & ID_{dz-1 \times dz-1} & -Tz(:,dz+1) \\ 0 & 0 \cdots & 1 \end{pmatrix}$$

$$= \begin{pmatrix} 1 & 0 & 0 & 0 & 0 & 0 \\ -1 & 1 & 0 & 0 & 0 & -1 \\ -1 & 0 & 1 & 0 & 0 & -1 \\ -64 & 0 & 0 & 1 & 0 & -1 \\ -64 & 0 & 0 & 0 & 1 & -1 \\ -729 & 0 & 0 & 0 & 1 & -1 \\ 0 & 0 & 0 & 0 & 0 & 1 \end{pmatrix}$$

-continued $$[z_{dz}; (z_{samples_{mid}} - Tz(:,1) \cdot z_{dz} - Tz(:,dz+1) \cdot z_0); z_0] =$$

$$\begin{pmatrix} 1 & 0 \dots & 0 \\ -Tz(:,1) & ID_{dz-1 X dz-1} & -Tz(:,dz+1) \\ 0 & 0 \dots & 1 \end{pmatrix} * z_{samples}$$

Multiplication by inverse matrix: $\begin{pmatrix} 1 & 0 \dots & 0 \\ 0_{dz-1X1} & \widetilde{Tz}^{-1} & 0_{dz-1X1} \\ 0 & 0 \dots & 1 \end{pmatrix} =$ $$\begin{pmatrix} 1.0 & 0.0 & 0.0 & 0.0 & 0.0 & 0.0 & 0.0 \\ 0.0 & 0.08333333 & 0.04166667 & -0.04166667 & -0.00833333 & 0.00833333 & 0.0 \\ 0.0 & -0.16666667 & -0.16666667 & 0.04166667 & 0.04166667 & 0.0 & 0.0 \\ 0.0 & -0.58333333 & -0.04166667 & 0.29166667 & -0.04166667 & -0.04166667 & 0.0 \\ 0.0 & 0.66666667 & 0.66666667 & -0.04166667 & -0.04166667 & 0.0 & 0.0 \\ 0.0 & 1.0 & -0.5 & -0.25 & 0.05 & 0.03333333 & 0.0 \\ 0.0 & 0.0 & 0.0 & 0.0 & 0.0 & 0.0 & 1.0 \end{pmatrix}$$

Multiplication by inverse with whole values: $\begin{pmatrix} 1 & 0 \dots & 0 \\ 0_{dz-1X1} & \widetilde{Tz}^{-1} & 0_{dz-1X1} \\ 0 & 0 \dots & 1 \end{pmatrix} *$ $$120 = \begin{pmatrix} 120 & 0 & 0 & 0 & 0 & 0 & 0 \\ 0 & 10 & 5 & -5 & -1 & 1 & 0 \\ 0 & -20 & -20 & 5 & 5 & 0 & 0 \\ 0 & -70 & -5 & 35 & -5 & -5 & 0 \\ 0 & 80 & 80 & -5 & -5 & 0 & 0 \\ 0 & 120 & -60 & -30 & 6 & 4 & 0 \\ 0 & 0 & 0 & 0 & 0 & 0 & 120 \end{pmatrix}$$

Equivalent matrix:

$\widehat{Tz} =$ $$120 \begin{pmatrix} 1 & 0 \dots & 0 \\ 0_{dz-1X1} & \widetilde{Tz}^{-1} & 0_{dz-1X1} \\ 0 & 0 \dots & 1 \end{pmatrix} \begin{pmatrix} 1 & 0 \dots & 0 \\ -Tz(:,1) & ID_{dz-1X dz-1} & -Tz(:,dz+1) \\ 0 & 0 \dots & 1 \end{pmatrix} =$$

$$\begin{pmatrix} 120 & 0 & 0 & 0 & 0 & 0 & 0 \\ -360 & 10 & 5 & -5 & -1 & 1 & -10 \\ -600 & -20 & -20 & 5 & 5 & 0 & 30 \\ 1800 & -70 & -5 & 35 & -5 & -5 & 50 \\ 480 & 80 & 80 & -5 & -5 & 0 & -150 \\ -1440 & 120 & -60 & -30 & 6 & 4 & -40 \\ 0 & 0 & 0 & 0 & 0 & 0 & 120 \end{pmatrix}$$

Figure 16:
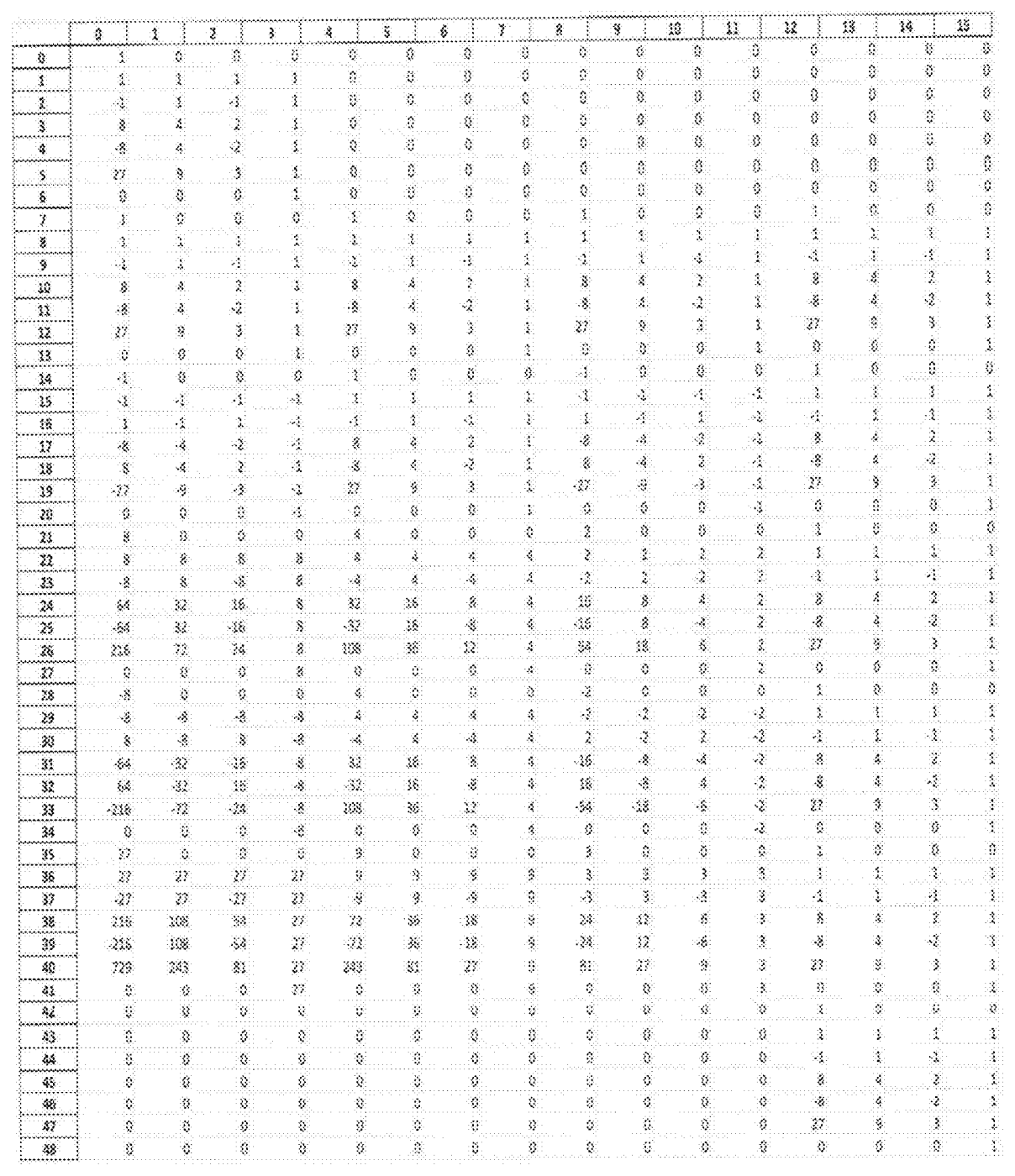

The following provides information on the full decomposition matrix used in Toom-Cook with two levels and four parts. FIG. 16 is a chart for sample points {1,−1,2,−2,3}.

The following is a mathematical analysis of Montgomery. Given $\bar{x}=xR \bmod n$, and y, one may compute z according to the following principles:

(1) Compute $z=\bar{x} \cdot \bar{y}$
(2) Find an integer $t \leq R$, such that $z \stackrel{\text{def}}{=} \bar{x} \cdot \bar{y} + t \cdot n = 0 \bmod R$.
(3) Since $\bar{x} = x \cdot R - c \cdot n$, $\bar{y} = y \cdot R - d \cdot n$ we have:

$$z = \bar{x} \cdot \bar{y} + t \cdot n = x \cdot y \cdot R^2 - (d \cdot x + c \cdot y) \cdot nR + c \cdot d \cdot n^2 + t \cdot n.$$

Since $z=0 \bmod R$, and $\gcd(n, R)=1$ this implies that $c \cdot d + t = a \cdot R$ for some integer a.

(4) Therefore $z/R = x \cdot y \cdot R - (d \cdot x + c \cdot y) \cdot n + a \cdot n$.
(5) So modulo n we have $z/R \bmod n = x \cdot y \cdot R \bmod n$.
(6) According to our assumption $t \leq R$, $\bar{x}$, $\bar{y} < n$, thus $z < n \cdot (n+R) < 2 \cdot n \cdot R$.

Thus $z/R < 2n$. So either $z/R < n$, or $z/R - n < n$

Exemplary Types of Memory

Finally, as mentioned above, any suitable type of memory can be used. Semiconductor memory devices include volatile memory devices, such as dynamic random access memory ("DRAM") or static random access memory ("SRAM") devices, non-volatile memory devices, such as ReRAM, electrically erasable programmable read only memory ("EEPROM"), flash memory (which can also be considered a subset of EEPROM), ferroelectric random access memory ("FRAM"), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional (2D) memory structure or a three dimensional (3D) memory structure.

In a 2D memory structure, the semiconductor memory elements are arranged in a single plane or a single memory device level. Typically, in a 2D memory structure, memory elements are arranged in a plane (e.g., in an x-z direction plane) that extends substantially parallel to a major surface of a substrate that supports the memory elements. The substrate may be a wafer over or in which the layer of the memory elements is formed or it may be a carrier substrate that is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A 3D memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements in each column. The columns may be arranged in a 2D configuration, e.g., in an x-z plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the 2D and 3D structures described but cover all relevant memory structures within the spirit and scope of the invention as described herein and as understood by one of skill in the art.

CONCLUSION

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:

1. A storage system comprising:
   a memory; and
   a controller comprising a processor and a plurality of hardware multipliers, wherein the controller is configured to:
      receive data from a host to store in the memory;
      transform the data received from the host to encrypted data by performing a cryptographic process to encrypt the data by:
         using the processor to:
            receive input numbers x and y for multiplication; and
            generate a plurality of levels of coefficient vectors for x and for y; and
         using the plurality of hardware multipliers to:
            perform a sample extraction process by multiplying the plurality of levels of coefficient vectors for x by a first decomposition matrix to yield a first result vector and by multiplying the plurality of levels of coefficient vectors for y by a second decomposition matrix to yield a second result vector;
perform a point multiplication process by multiplying the first and second result vectors to yield a third result vector; and
perform an interpolation process by multiplying the third result vector by a synthesis matrix to yield a result and dividing the result by a constant to yield a final result by accessing small, fast memory at algorithm concatenations with iterations done in a single clock cycle; and
store the encrypted data in the memory.

2. The storage system of claim 1, wherein the processor is configured to retrieve the constant from a look-up table.

3. The storage system of claim 1, wherein the plurality of hardware multipliers is configured to perform the dividing from multiple starting points and make corrections according to remainders of the division.

4. The storage system of claim 1, wherein the cryptographic process is based on a Toom-Cook algorithm comprising the plurality of levels of coefficient vectors.

5. The storage system of claim 1, wherein the plurality of hardware multipliers is configured to use a modified Montgomery multiplier to perform the multiplying from a most-significant bit to a least-significant bit.

6. The storage system of claim 1, wherein the first decomposition matrix comprises a product of decomposition matrices of each of the plurality of levels of coefficient vectors for x, and wherein the second decomposition matrix comprises a product of decomposition matrices of each of the plurality of levels of coefficient vectors for y.

7. The storage system of claim 6, wherein the plurality of hardware multipliers is configured to compute the first decomposition matrix offline and then perform the point multiplication process.

8. The storage system of claim 1, wherein the plurality of hardware multipliers is configured to perform the point multiplication process before the sample extraction process ends.

9. The storage system of claim 1, wherein the memory comprises a three-dimensional memory.

10. In a data storage device comprising a memory and a controller comprising a processor and a plurality of hardware multipliers, a method comprising:
receiving data from a host to store in the memory;
transforming the data received from the host to encrypted data by performing a cryptographic process to encrypt the data by:
using the processor to:
receive input numbers x and y for multiplication; and
generate a plurality of levels of coefficient vectors for x and for y; and
using the plurality of hardware multipliers to:
perform a sample extraction process by multiplying the plurality of levels of coefficient vectors for x by a first decomposition matrix to yield a first result vector and by multiplying the plurality of levels of coefficient vectors for y by a second decomposition matrix to yield a second result vector;
perform a point multiplication process by multiplying the first and second result vectors to yield a third result vector; and
perform an interpolation process by multiplying the third result vector by a synthesis matrix to yield a result and dividing the result by a constant to yield a final result by accessing small, fast memory at algorithm concatenations with iterations done in a single clock cycle; and
storing the encrypted data in the memory.

11. The method of claim 10, further comprising using the processor to retrieve the constant from a look-up table.

12. The method of claim 10, further comprising using a Toom-Cook algorithm comprising the plurality of levels of coefficient vectors, wherein the plurality of levels of coefficient vectors comprises two levels, each of the two levels comprising four parts.

13. The method of claim 10, further comprising using a modified Montgomery multiplier to perform the multiplying from a most-significant bit to a least-significant bit.

14. The method of claim 10, wherein the first decomposition matrix comprises a product of decomposition matrices of each of the plurality of levels of coefficient vectors for the first number, and wherein the second decomposition matrix comprises a product of decomposition matrices of each of the plurality of levels of coefficient vectors for the second number.

15. The method of claim 10, further comprising using a plurality of hardware multipliers to perform a point multiplication process before a sample extraction process ends.

16. The method of claim 10, wherein the method is performed in a controller of a storage system.

17. The method of claim 11, wherein the method is performed in a host in communication with a storage system.

18. A data storage device comprising:
a memory; and
means for transforming data received from a host to store in the memory to encrypted data by performing a cryptographic process to encrypt the data by:
using a processor to:
receive input numbers x and y for multiplication; and
generate a plurality of levels of coefficient vectors for x and for y; and
using the plurality of hardware multipliers to:
perform a sample extraction process by multiplying the plurality of levels of coefficient vectors for x by a first decomposition matrix to yield a first result vector and by multiplying the plurality of levels of coefficient vectors for y by a second decomposition matrix to yield a second result vector;
perform a point multiplication process by multiplying the first and second result vectors to yield a third result vector; and
perform an interpolation process by multiplying the third result vector by a synthesis matrix to yield a result and dividing the result by a constant to yield a final result by accessing small, fast memory at algorithm concatenations with iterations done in a single clock cycle; and
means for storing the encrypted data in the memory.

* * * * *